US 12,409,602 B2

(12) United States Patent
Feinberg et al.

(10) Patent No.: US 12,409,602 B2
(45) Date of Patent: Sep. 9, 2025

(54) MODIFICATION OF RHEOLOGY AND MACHINE PATHING FOR IMPROVED 3D PRINTING OF SOFT MATERIALS

(71) Applicant: CARNEGIE MELLON UNIVERSITY, Pittsburgh, PA (US)

(72) Inventors: Adam Walter Feinberg, Pittsburgh, PA (US); Maria Stang, Pittsburgh, PA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 371 days.

(21) Appl. No.: 17/754,115

(22) PCT Filed: Oct. 19, 2020

(86) PCT No.: PCT/US2020/056338
§ 371 (c)(1),
(2) Date: Mar. 24, 2022

(87) PCT Pub. No.: WO2021/077091
PCT Pub. Date: Apr. 22, 2021

(65) Prior Publication Data
US 2022/0332040 A1    Oct. 20, 2022

Related U.S. Application Data

(60) Provisional application No. 62/973,696, filed on Oct. 18, 2019.

(51) Int. Cl.
*B29C 64/118* (2017.01)
*B29C 64/209* (2017.01)
(Continued)

(52) U.S. Cl.
CPC .......... *B29C 64/118* (2017.08); *B29C 64/209* (2017.08); *B29C 64/321* (2017.08);
(Continued)

(58) Field of Classification Search
CPC ... B29C 64/118; B29C 64/209; B29C 64/321; B29C 64/393; B29C 64/40;
(Continued)

(56) References Cited

U.S. PATENT DOCUMENTS 8,021,646 B2    9/2011  Sulzer et al.
8,455,038 B2    6/2013  Amaya et al.
(Continued)

FOREIGN PATENT DOCUMENTS

JP    2011218078 A    11/2011
WO   2014109391 A1    7/2014
(Continued)

OTHER PUBLICATIONS

International Search Report and Written Opinion of the International Searching Authority for International Application No. PCT/US2020/056338 mailed Mar. 10, 2021.
(Continued)

*Primary Examiner* — Xiao S Zhao
*Assistant Examiner* — Victoria Bartlett
(74) *Attorney, Agent, or Firm* — K&L Gates LLP

(57) ABSTRACT

A method and system for additive manufacturing are provided herein. The method comprises depositing a structure material, by a nozzle (810), into a support material (808) by applying to the structure material such that the structure material flows through the nozzle. The structure material comprises a polymer and a rheological modifier. Depositing of the structure material is repeated as necessary to create an object (814). The support material is at least partially removed from object. In various examples, the method comprises varying a print parameter from a first portion of the object to a second portion of the object, moving the nozzle away from a previously deposited layer of the object
(Continued)

when repositioning for deposition of a subsequent layer of the object, or a combination thereof.

17 Claims, 12 Drawing Sheets

(51) Int. Cl.
| | |
|---|---|
| *B29C 64/321* | (2017.01) |
| *B29C 64/40* | (2017.01) |
| *B29K 83/00* | (2006.01) |
| *B29K 105/00* | (2006.01) |
| *B33Y 10/00* | (2015.01) |
| *B33Y 30/00* | (2015.01) |
| *B33Y 70/00* | (2020.01) |

(52) U.S. Cl.
CPC ............. *B29C 64/40* (2017.08); *B33Y 10/00* (2014.12); *B33Y 30/00* (2014.12); *B33Y 70/00* (2014.12); *B29K 2083/00* (2013.01); *B29K 2105/0058* (2013.01)

(58) Field of Classification Search
CPC ....... B29C 64/124; B33Y 10/00; B33Y 30/00; B33Y 40/00; B33Y 50/02; B33Y 70/00; B29K 2083/00; B29K 2105/0058
See application file for complete search history.

(56) References Cited

U.S. PATENT DOCUMENTS

| | | | |
|---|---|---|---|
| 10,150,258 | B2 | 12/2018 | Feinberg et al. |
| 2007/0265521 | A1 | 11/2007 | Redel et al. |
| 2011/0257744 | A1 | 10/2011 | Amaya et al. |
| 2016/0157989 | A1 | 6/2016 | Wagner et al. |
| 2016/0167312 | A1* | 6/2016 | Feinberg ................ A61L 27/54 264/239 |
| 2017/0151733 | A1 | 6/2017 | Lewis et al. |
| 2017/0217091 | A1 | 8/2017 | Hull |
| 2017/0253751 | A1* | 9/2017 | Busbee ................ C09D 175/06 |
| 2017/0340336 | A1 | 11/2017 | Osypka |
| 2017/0369731 | A1 | 12/2017 | Lisitsin et al. |
| 2018/0281295 | A1 | 10/2018 | Tibbits et al. |
| 2018/0296367 | A1 | 10/2018 | Bellicchi et al. |
| 2018/0296783 | A1 | 10/2018 | Davis |
| 2018/0321659 | A1 | 11/2018 | Dasappa et al. |
| 2020/0032004 | A1 | 1/2020 | Hudson et al. |
| 2020/0189202 | A1 | 6/2020 | Hudson et al. |

FOREIGN PATENT DOCUMENTS

| | | |
|---|---|---|
| WO | 2015017421 A2 | 2/2015 |
| WO | 2016092106 A1 | 6/2016 |
| WO | 2018014440 A1 | 1/2018 |
| WO | 2019199971 A1 | 10/2019 |

OTHER PUBLICATIONS

International Search Report and Written Opinion for International PCT Application No. PCT/US2019/026787, dated Jul. 23, 2019.
Fessenden, 3-D printed windpipe gives infant breath of life, Nature | Scientific American (May 28, 2013), pp. 1-3.
Li et al., Single-impulse Panoramic Photoacoustic Computed Tomography of Small-animal Whole-body Dynamics at High Spatiotemporal Resolution, Nature Biomedical Engineering (2017), 1(5):1-26.
Jin et al., In vivo vascularization of MSC-loaded porous hydroxyapatite constructs coated with VEGF-functionalized collagen/heparin multilayers, Scientific Reports (Jan. 22, 2016), 6(19871):1-13.
Abu-Sardanash et al., Design and evaluation of a diffusion MRI fibre phantom using 3D printing (Mar. 9, 2018), Abstract.
Poon et al., Controlling the mechanical microenvironment of human airway epithelial cells for tracheal tissue engineering, Front. Bioeng. Biotechnol. Conference Abstract: 10th World Biomaterials Congress (Mar. 20, 2016), Abstract.
Hinton et al., Three-dimensional printing of complex biological structures by freeform reversible embedding of suspended hydrogels (Oct. 23, 2015), Sci. Adv. (Oct. 23, 2015), 1:1-10.
Lee et al., 3D bioprinting of collagen to rebuild components of the human heart, Science (Aug. 2, 2019), 365:482-487.
Hinton et al., 3D printing PDMS Elastomer in a Hydrophilic Support Bath via Freeform Reversible Embedding, ACS Biomaterials Science & Engineering (May 4, 2016), 2:1781-1786.
Abdollahi et al., Experit-guided optimization for 3D printing of soft and liquid materials (Apr. 5, 2018), Expert-guided optimization for 3D printing of soft and liquidmaterials. PLoS ONE 13(4): e0194890. https://doi.org/10.1371/journal.pone.0194890, pp. 1-11.
Alharbi N., et al., Factors Influencing the Dimensional Accuracy of 3D-Printed Full-Coverage Dental Restorations Using Stereolithography Technology, The International Journal of Prosthodontics, vol. 29, No. 5, 2016, pp. 503-510. (Abstract).
Extended European Search Report for European Application No. 19785330.2 mailed Dec. 9, 2021.
Yu et al., The Effect of Injected RGD Modified Alginate on Angiogenesis and Left Ventricular Function in a Chronic Rat Infarct Model, Biomaterials, 30, 2009, pp. 751-756.

* cited by examiner

MODIFICATION OF RHEOLOGY AND MACHINE PATHING FOR IMPROVED 3D PRINTING OF SOFT MATERIALS

PRIORITY CLAIM

The present application claims priority to U.S. provisional patent application Ser. No. 62/973,696, filed Oct. 18, 2019, which is incorporated herein by reference in its entirety.

GOVERNMENT SUPPORT

This invention was made with government support under Government Contract No. DGE 1745016 awarded by the National Science Foundation. The government has certain rights in the invention.

BACKGROUND

There are materials that have been difficult to adapt for use in additive manufacturing. For example, thermally cured thermoset polymers such as epoxies and silicones are widely used in many applications for their combination of mechanical properties, chemical resistance, and thermal stability. However, these thermoset polymers are often two-part systems that are mixed and then can take minutes to hours to crosslink and fully cure. These thermoset polymers can remain in a liquid state for a prolonged period. Therefore, these thermoset polymers can be challenging to additively manufacture with high fidelity because they can flow and may not retain their intended geometry. Additionally, extrusion-based direct ink writing (DIW) and fused deposition modeling (FDM) can have trouble printing geometries such as overhangs and or other free-standing structures that are difficult to print without using a support. These constraints on the materials and geometries that can be additively manufactured present challenges.

SUMMARY

In one general aspect, the present invention is directed to an additive manufacturing method. The method comprises, in various embodiments, depositing a structure material, by a nozzle, into a support material by applying a force to the structure material such that the structure material flows through the nozzle. The structure material can comprises a yield stress, a thixotropic property, an increase viscosity due to the rheological modifier, or a combination thereof. Applying the force to the structure material can comprises applying a force of at least the yield stress to the structure material, applying a force to cause the structure material to flow through the nozzle, or a combination thereof. In certain examples, the force is at least the yield stress of the structure material and the yield stress of the structure material is in a range of 1 Pa to 10 kPa, such as, for example 10 Pa to 200 Pa. The structure material comprises a polymer and a rheological modifier. The structure material can comprise, for example, 0.1% to 50% by weight of the rheological modifier. The rheological modifier can comprise, for example, a thixotropic additive a thixotropic additive, a particle filler, a polymer-based additive, or a combination thereof. The polymer can comprise, for example, a thermoset, such as, for example, a silicone based polymer (e.g., PDMS), an epoxy based polymer, a urethane based polymer, or a combination thereof. Depositing of the structure material is repeated as necessary to create an object. The structure material can be cured after the depositing. The support material is at least partially removed from object.

In another general aspect, the additive manufacturing method comprises depositing a structure material through a nozzle of an extruder assembly into a support material and repeating the depositing of the structure material as necessary to create an object. A print parameter of the depositing varies from a first portion of the object to a second portion of the object, the nozzle is configured to move away from a previously deposited layer of the object when repositioning for deposition of a subsequent layer of the object, or a combination thereof. The support material is at least partially removed from the object. The print parameter can comprise, for example, a flow rate of the structure material through the nozzle, a direction of extrusion, an infill parameter, a translation rate of the nozzle, layer height, a direction of translation of the nozzle, a print pattern, a cure parameter, or a combination thereof. The structure material can comprise, for example, a polymer and a rheological modifier and the structure material can comprise a yield stress is in a range of 1 Pa to 10 kPa. Depositing the structure material comprises applying a force to the structure material such that the structure material flows through the nozzle. The force can be at least the yield stress of the structure material.

In another general aspect, the present invention is directed to a system for additive manufacturing. The system comprises an extruder assembly comprising a nozzle configured to deposit structure material and a material deposition region configured to receive support material. The system also comprises a processor coupled to a non-transitory memory. The non-transitory memory comprises machine executable instructions that when executed by the processor cause the processor to control the nozzle such that the nozzle deposits the structure material into a support material that is situated on the material deposition region by applying a force to the structure material such that the structure material flows through the nozzle. In certain examples, the structure material comprise a yield stress and the force applied is at least the yield stress of the structure material. The non-transitory memory also comprises machine executable instructions that when executed by the processor cause the processor to control the nozzle to repeat the depositing of the structure material as necessary to create an object and at least partially remove the support material from the object.

In another general aspect, an additive manufacturing method of the present invention comprises receiving, by a processor, a part file of an object, and separating, by the processor, the part file into different part segments, with each part segment containing a portion of the part file. The method also comprises creating, by the processor, machine path instructions for each segment based on the design of the portion of the part file in the respective segment and storing the machine pathing instructions in memory. The machine path instructions vary between at least two segments, such as a variance of a flow rate of a structure material through a nozzle, a direction of extrusion, an infill parameter, a translation rate of the nozzle, layer height, a direction of translation of the nozzle, a print pattern, a cure parameter, or a combination thereof. In certain examples, the nozzle is configured to move away from a previously deposited layer of the object when repositioning for deposition of a subsequent layer of the object.

In another general aspect, the system for additive manufacturing of the present invention comprises a processor coupled to a non-transitory memory where the non-transitory memory comprises machine executable instructions that when executed by the processor cause the processor to receive a part file of an object, and separate the part file into different part segments, with each part segment containing a portion of the part file. The non-transitory memory comprises machine executable instructions that when executed by the processor also cause the processor to create machine path instructions for each segment based on the design of the portion of the part file in the respective segment and store the machine instructions in memory. The machine path instructions vary between at least two segments.

In another general aspect, an additive manufacturing system of the present invention comprises an extruder assembly, a material deposition region, and a processor. The extruder assembly comprises a nozzle configured to deposit structure material. The material deposition region is configured to receive support material. The processor is operatively coupled to non-transitory memory. The processor is configured to control the deposition of the structure material through the nozzle. The processor is configured to vary a print parameter from a first portion of the object to a second portion of the object, configured to move the nozzle away from a previously deposited layer of the object when repositioning for deposition of a subsequent layer of the object, or a combination thereof. The print parameter can comprise a flow rate of the structure material through the nozzle, a direction of extrusion (e.g., extrude, retract), an infill parameter, a translation rate of the nozzle, layer height, a direction of translation of the nozzle, a print pattern, a cure parameter, or a combination thereof.

Various embodiments and implementations of the present invention provide many benefits and improvements relative to prior additive printing techniques. For example, rheological modification of the structure materials can be leveraged to create yield stress fluids that are more capable of maintaining their printed geometries. Additionally, intelligent machine pathing and careful selection of print parameters can improve printed geometry. Specifically, interactions between the print nozzle and extruded filament can be minimized to prevent filament distortion. Travel moves can be configured to take place outside the body of the print, and retraction should be employed to diminish stringing artifacts. A modular approach to machine pathing may achieve printed constructs with the highest fidelity. Furthermore, a robust additive manufacturing system with sturdy hardware can be used to extrude thixotropic, viscous fluids. These and other benefits that are potentially realizable through various implementations of the present invention will be apparent from the description that follows.

BRIEF DESCRIPTION OF THE DRAWINGS

The features and advantages of the examples of the present invention, and the manner of attaining them, will become more apparent, and the examples will be better understood, by reference to the following description taken in conjunction with the accompanying drawings, which show by way of example various aspects of the present invention.

Figure 1A:
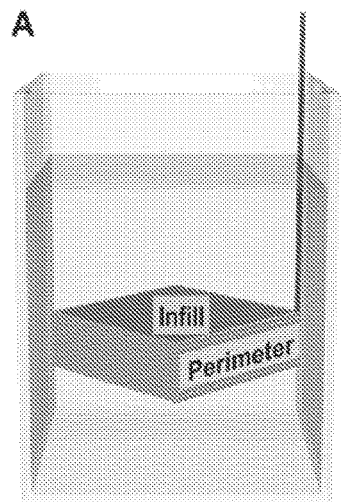
FIG. 1A is an image of a rendering of an example calibration cube with an infill region and a perimeter region.

The exemplifications set out herein illustrate certain embodiments, in one form, and such exemplifications are not to be construed as limiting the scope of the appended claims in any manner.

DESCRIPTION

As used herein, "additive manufacturing" means a process of joining materials to make objects from 3D model data, usually layer upon layer, as opposed to subtractive manufacturing methodologies. For example, additive manufacturing can comprise fused deposition modeling (FDM) and Freeform Reversible Embedding (FRE). FDM can comprise extruding a material by heating it to a temperature above is melting temperature and depositing the extruded material in a pattern to form a layer of an object. Subsequent layers can be deposited on top of the previous layer as necessary to form an object.

Freeform Reversible Embedding (FRE) is similar to FDM, but instead of depositing a material on top of previous depositions or supports, FRE embeds structure material near other embedded deposits inside a support material and relies on the triggered assembly or reorganization of the material using targeted heating, photopolymerization, crosslinking, slow reaction kinetics, application of binders, and/or other curing technique. For example, the support material may provide divalent cations for crosslinking, such that when the structure material contact the support material, the structure material begins to cure.

For additive manufacturing techniques such as FDM, support materials are usually as stiff as the printed material, printed as part of the previous layer, and placed only underneath or neighboring the print layers to prevent deformations. In FRE, the support material can surround the extrusion nozzle and the print material can be deposited inside the support. The support material can be a non-newtonian fluid that allows for deposition of various materials while maintaining a buoyant, physical support for already embedded deposits of print material. When two embedded deposits of print material with a predetermined distance inside of the support material, they can fuse. After punting, the support material can be removed from the deposited print material to form a fully assembled object from the deposited print material.

In FRE, an object can be printed in any direction in 3D space and is not limited to layer-by-layer printing. For example, a structure can also be printed layer by layer in an X-Y plane, or a non-X-Y plane, such as the X-Z plane, or in a plane at any angle offset from the X-Y Plane. An object can also be printed utilizing FRE in a non-planar fashion, such as, for example, in a curved path such as a helix, Utilizing FRE can enable printing of objects with mechanical properties that are different in the plane of printing versus orthogonal to the plane of printing or other angle to the plane of printing. Additional details regarding the FRE process can be found in U.S. Pat. No. 10,150,258, titled ADDITIVE MANUFACTURING OF EMBEDDED MATERIALS, filed Jan. 29, 2016, which is hereby incorporated by reference herein.

FRE printing of soft polymers, such as silicone-based polymers, epoxy-based polymers, and others, has presented challenges. For example, infill patterns where each layer is extruded off-axis to the layer below has not been possible due to variable filament morphology (e.g., the shape of the structure material extruded from the nozzle) and high filament deformability. Furthermore, filament morphology can affect the accuracy of prior space-filling models for machine pathing when slicing a part file, such as, an STL model into G-code for printing. Additionally, many soft polymers do not cure instantaneously and instead cure over time or by exposure to external stimuli (heat, UV, etc.). These soft polymers are thus often highly deformable after deposition and are susceptible to disruptions from the movement of the extrusion nozzle during printing. Furthermore, the composition and surface energy of the materials used in FRE can impede fusion unless sufficient contact and applied force between individual filaments is achieved. These challenges have limited the achievable geometries in FRE additive manufacturing using soft polymers to simple models and inhibited the use of FRE for more complex geometries.

Various implementations of the present invention improve FRE additive manufacturing by exploiting or otherwise using rheology, filament morphology, and deformability of how these soft polymers impact printing performance. For example, polydimethylsiloxane (PDMS) (e.g., Sylgard 184, a PDMS prepolymer) exhibits Newtonian behavior and can flow after deposition until cured, which can take minutes to hours depending on temperature, and which can make it difficult for the deposited PDMS to resist deformation. The inventors surprisingly discovered that by introducing a rheological modifier into the polymer (e.g., PDMS prepolymer), a yield stress fluid that is more resistant to deformation after deposition into the support material can be created, thereby making the yield stress fluid more capable of maintaining its printed geometry. The rheological modifier is also applicable to other soft polymers than PDMS. The rheological modifier is also applicable to other polymers that may be semi-rigid or rigid.

Additionally, the filament morphology and deformability can affect print planning and pathing in slicing software for FRE. Prior FDM slicing software, which takes a part file (e.g., computer aided design (CAD) model) and generates the machine pathing for the additive manufacturing system, assume that filaments are flattened during extrusion and do not deform after extrusion. The inventors have discovered that FRE filament behavior is significantly different from FDM and requires different machine pathing instructions and parameters. For example, the FRE filaments are highly deformable and do not possess a consistent morphology, which can be dependent on the local surroundings (e.g., region of print, proximity to other filaments). The inventors discovered that prior slicing software for FDM did not account for these considerations and thus was not optimized for FRE additive manufacturing. Based on these discoveries, the machine pathing instructions and print parameters can be optimized and, based on these optimizations, the inventors have been able to achieve complex structures with various soft polymers, such as PDMS, previously unattainable via typical additive manufacturing approaches. In various examples, rheological modification of the structure material, optimized machine pathing, and use of a support bath, can enable the additive manufacture of complex geometries with soft polymers.

Figure 8:
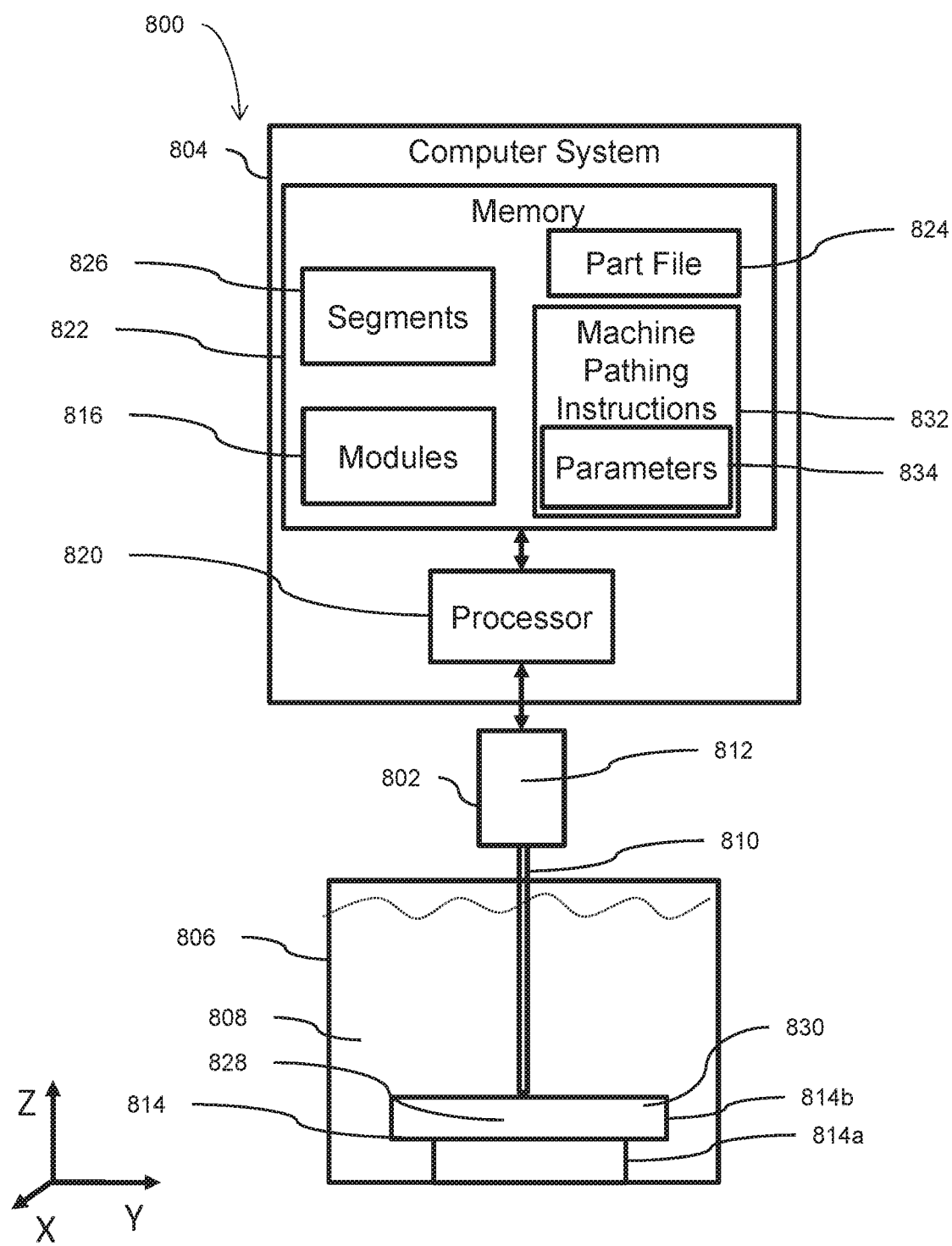
FIG. 8 is a block diagram of an example of an additive manufacturing FRE system according to the present disclosure, the X-axis is coming out of the page.

Referring to FIG. 8, a block diagram illustrating an example of an additive manufacturing system 800 for FRE according to the present disclosure is provided. The system 800 comprises an extruder assembly 802, a computer system 804, and a material deposition region 806. The computer system 804 is in signal/data communication with the extruder assembly 802 (such as via a wired and/or wireless data bus or link) and the computer system 804 can be configured through programming to control the operation of the extruder assembly 802.

The extruder assembly 802 may be a syringe-based extruder, which can include a reservoir 812 (e.g., a barrel of a syringe) for receiving and storing structure material, and a nozzle 810 (e.g., a needle) which can be in fluid communication with the reservoir 812 and can receive the structure material from the reservoir 812. The structure material can be extruded through the nozzle 810 and the nozzle 810 can be configured to deposit the extruded structure material in the support material 808 disposed in the material deposition region 806. In various examples, the extruder assembly 802 can comprise a gantry or other robotic device to support and/or move the extruder assembly 802 relative to the material deposition region 806. Optionally, the extruder assembly can comprise a motor assembly or other movement assembly configured to translate and/or rotate the gantry and/or robotic device. In various examples, the extruder assembly 802 comprises an actuator (e.g., a motor) configured to depress a plunger into the reservoir 812 to extrude the structure material through the nozzle 810 into the support material 808 as the nozzle 810 is translated through the support material 808 to create an object 814.

The computer system 804 comprises one or more processors 820 operatively coupled to one or more memories 822 (only one processor 820 and one memory 822 in FIG. 8 for simplicity). The memory 822 can comprise primary storage (e.g., main memory that is directly accessible by the processor 820, such as RAM, ROM processor registers or processor cache); secondary storage (e.g., SSDs or HDDs that are not directly accessible by the processor); and/or off-line storage. The memory 822 stores computer instructions (e.g., software) that is executed by the processor 820. The processor 820 can be configured (through execution of the software stored in the memory 822) to control the deposition of the structure material through the nozzle 810. For example, the processor 820 can control the flow rate of structure material through the nozzle 810 (e.g., by the actuation rate of a plunger in the extruder assembly 802) and/or the pose of the extruder assembly 802 relative to the material deposition region 806.

The processor can receive a digital or electronic part file 824 of the object 814 to be manufactured by the additive manufacturing process from the memory 822 or from another device (e.g., another computer device, cloud). The object 814 can be various object types, such as, for example, a soft structure, a bioprosthetic, a scaffold, a medical device, an implantable device, a gasket, a tube, a seal, an aerospace part, an automotive part, a building component, or other structures that may be additively manufactured. The part file 824 can be in a variety of different digital or electronic formats, such as an STL file, a OBJ file, a FBS file, a COLLADA file, a 3DS file, an IGES file, a STEP file, a VRML/X3D file, a point cloud, or another 3D model file format type.

The processor 820 can be configured to separate (e.g., slice (utilizing Slic3r, Skeinforge, KISSlicer software, etc.)) the part file 824 into different part segments 826, each segment containing a portion of the part file 824. In various examples, the processor 820 can be configured to convert the part file 824 to a different 3D model file format prior to separating.

Each part segment 826 can be a layer, 814*a* and 814*b*, of the object 814 to be deposited, a portion of a layer, 814*a* and 814*b*, of the object 814 to be deposited, or other geometry of the object 814. The segments 826 can be created based on a design of the part file 824. For example, a segment of segments 826 can comprise an overlapping region 828 (e.g., printed directly over layer 814*a*) of layer 814*b*, an overhang region 830 of layer 814b, an infill region, a perimeter region, another region of the object 814, or a combination thereof. For example, the overhang region 830 can be in an overhang segment of segments 826 different than an overlapping segment of segments 826 for the overlapping region 828. In various examples, a perimeter region of the object 814 can be in a perimeter segment of segments 826 different than an infill segment of segments 826 for an infill region. Each segment 826 may or may not be in the X-Y plan and a segment can be in a non-X-Y plane, such as the X-Z plane, the Y-Z plane, other plane offset from the X-Y plane, or a non-planar segment, such as, for example, a curve. Utilizing various segments 826 for different region of the object 814 can enable variations of machine path instructions and/or print parameters for each segment 826. Therefore, the machine path instructions and/or print parameters can be selected to suit the particular geometry to be printed in the respective segment 826.

From the segments 826, the processor 120 can be configured to create machine path instructions (e.g., G-code instructions) 832 for the segments 826 based on the design of the portion of the part file 824 in the respective segment 826. The machine path instructions 832 can be stored in the memory 822. The machine path instructions 832 can comprise print parameters 834 and can be executed by the processor 820 to cause the processor 820 to control the operation (e.g., pose, extrusion) of the extruder assembly 802. In various examples, the machine path instructions 832 for at least two segments 832 can vary by print parameters 834, such as, for example, at least three segments 832 can vary by print parameters 834. The print parameters 834 can be a flow rate of the structure material through the nozzle 810, a direction of extrusion, an infill parameter (e.g., density, pattern), a translation rate of the nozzle 810, layer height, a direction of translation of the nozzle 810, a print pattern, a cure parameter, a combination thereof, or other print parameter.

The machine pathing instructions 832 and print parameters 834 can be associated with a respective segment 826 and suited to the geometry and intended mechanical properties of the region of the part file 824 in the associated respective segment 826 to be printed. The processor 820 can be configured to vary a print parameter 834 used for the control of the extruder assembly 802 from a first portion of the object 814 to a second portion of the object 814. For example, the process can utilize different flow rates of the structure material through the nozzle 810 between the first and second portions, different directions of extrusion, different infill parameter (e.g., density, pattern) between the first and second portions, different translation rates of the nozzle 810 between the first and second portions, different deposition heights of the nozzle 810 between the first and second portions, different directions of translation of the nozzle 810 between the first and second portions, different print patterns between the first and second portions, different cure parameters between the first and second portions, a combination thereof, or utilizes various other different print parameters. Thus, separating of the part file 824 can enable machine pathing instructions 832 and print parameters 834 based on the portion of the object 814 being additively manufactured thereby, enabling an enhanced printing of the object 814.

The infill region of the object 814 is typically a repetitive geometric pattern having a defined porosity that is utilized to occupy what would otherwise be empty spaces within the object 814. Infill density can be represented, for example, as a percentage from 0-100%, where 0% represents a complete hollow space and 100% represents a solid object. Infill density can affect the weight, strength, and other mechanical properties of the object 814. Furthermore, the infill region of the object 814 can be fabricated in a variety of different patterns, such as grids, lines, honeycomb structures, and other patterns. Various infill patterns can be more suitable for differently shaped structures and/or change the mechanical properties of the structure (e.g., provide non-uniform strength characteristics). The object 814 can be fabricated to have a non-uniform infill density and/or patterns throughout the object 814 based on the machine pathing instructions 832 and parameters 834. Therefore, different regions of the object 814 can have different weights, strengths, and mechanical properties.

The mechanical properties of the object 814 can also be customized by controlling the directions and/or patterns in which the structure material is deposited by the nozzle 810. During additive manufacturing of the object 814, the structure material can be deposited by the nozzle 810 as a series of successive planar or arbitrary 3D striations that fuse together to ultimately form the object 814. The longitudinal axes of the striations can be orthogonal to the direction in which the layers or striations are added. The striations can be anisotropic, exhibiting different mechanical properties (e.g., tensile strength) along their longitudinal axes than their lateral axes, which in turn affects the mechanical properties of the object 814. Therefore, controlling the direction in which the striations are deposited to form the object 814 can control the mechanical properties of the object 814. For example, if it was desired for the object 814 to exhibit a higher tensile strength in a particular direction, the nozzle 810 could be controlled to deposit the structure material such that the longitudinal axes of the striations were aligned with that desired direction. Further, as noted above, the directions in which the striations are deposited can be any 3D movement and are not limited to planar movements.

Based on the machine pathing instructions 832, the nozzle 810 can be configured to move away from a previously deposited layer of the object 814 when repositioning for deposition of a subsequent layer of the object 814. For example, after printing layer 814a, the nozzle 810 can perform non-print moves in X-Y coordinates that the layer 814a was not deposited in. After printing layer 814a, non-print moves can include movement of the nozzle 810 to the starting position for printing layer 814b while structure material is not be extruded. Since the nozzle 810 has to translate through the support material 808, moving over top of a previous layer can disturb the shape of the previous layer. Minimizing movements over the previous layer during the non-print moves can enable an enhanced printing of the object 814.

The nozzle 810 can be configured to deposit a structure material into the support material 808 by applying a force to the structure material in the reservoir 812 such that the structure material can flow from the reservoir 812 through the nozzle 810. The structure material can comprise a yield stress, a thixotropic property, an increased viscosity due to the rheological modifier (e.g., compared to the structure material without the rheological modifier), or a combination thereof. In various examples, the structure material comprises both a yield stress and a thixotropic property. In examples where the structure material comprises a yield stress, the force applied can be at least the yield stress. In certain examples, applying the force to the structure material can cause the structure material to flow through the nozzle. For example, with an increase viscosity, the force can overcome the increased viscosity and cause the material to flow through the nozzle. In examples wherein the structure material comprises a thixotropic property, the thixotropic property can cause the time scale to start flow of the structure material to be longer than the printing process.

In various examples, a plunger can be translated through the reservoir 812. In various examples, the force can be pneumatically applied or the deposition can be controlled by a cavity pump. The application of the force can cause the structure material to change form a solid or semi-solid state into fluid state (e.g., liquid), so that the structure material can be deposited into the support material 808. The structure material can be suspended in the support material 808 at a location where the structure material was deposited by the nozzle 810 within the support material 808. Since the processor 820 can control the extruder assembly 802 and nozzle 810, the deposition of the structure material by the nozzle 810 can be based on the machine path instructions 832 and associated print parameters 834 as executed by the processor 820.

The extruder assembly 802 can move the nozzle 810 in two-dimensions when depositing structure material similar to FDM or in three-dimensions when depositing material, i.e., simultaneously in the X, Y, and Z directions. Further, the extruder assembly 802, nozzle 810, and/or material deposition region 806 can be rotatable. The machine pathing instructions can be defined according to both Cartesian and rotational coordinates, which can allow for the production of objects having complex geometries or very specific mechanical properties. 3D movement of the nozzle 810 during deposition of the structure material can enable, for example, additive manufacture of a helical spring in one constant motion. In various examples, other complex geometries are achievable with robotic arm assemblies capable of simultaneously controlling movement with six degrees of freedom (i.e., in any Cartesian or rotational direction).

The depositing of the structure material can be repeated as necessary to create an object. For example, the processor 820 can control the nozzle 810 to deposit the structure material in layers, such as layers 814a and 814b, in order to create the object 814 in the support material 808 based on the part file 824, another plane, and/or non-planar movement. In some examples, layer 814a can be deposited prior to layer 814b. Layer 814a may not be partially and/or fully cured prior to deposition of layer 814b. Thus, the processor 820 can control the nozzle 810 to deposit layer 814b proximal to (e.g., adjacent, in contact with, directly on top of) the layer 814a such that the deposition of the layer 814b deforms the layer 814a. For example, deposition of layer 814b can change the shape of at least a portion of layer 814a. The changed shape of at least a portion of layer 814a can be one that cannot be achieved by simple extruding out of the nozzle 810. Changing the shape of the layer 814a by deposition of layer 814b can increase contact surface area between the layers, 814a and 814b, decrease void space between the layers, 814a and 814b, improve adhesion between the layers, 814a and 814b, or a combination thereof.

The structure material can comprise a yield stress material that transitions between a fluid (e.g., liquid) state to a solid or semi-solid state by application of a pressure. For example, the structure material can be in a solid or semi-solid state in the extruder assembly 802, a pressure can be applied to the structure material to transition the structure material to a fluid state such that the structure material can flow through the nozzle 810 and can be deposited into the support material 808. After leaving the nozzle 810, the applied pressure to the structure material is removed and the structure material can transition into a solid or semi-solid state and thereby resisting deformation while in the material deposition region 806.

The structure material can comprise a polymer and a rheological modifier. The polymer can comprise a polymeric resin (e.g., a pre-polymer resin), a curing agent, and other additives. For example, the polymer can comprise an alginate material, a collagen material, a fibrin material, a hyaluronic acid material, a protein material, a polysaccharide hydrogel material, a synthetic gel material, an elastomeric polymer material, a rigid polymer material, or a combination thereof. In various examples, the polymer can comprise a thermoset polymer. The polymer can comprise a silicone based polymer, such as, for example, polydimethylsiloxane (PDMS), an epoxy based polymer, a urethane based polymer, or a combination thereof. The structure material can comprise at least 70% polymer based on the total weight of the structure material, such as, for example, at least 80% polymer based on the total weight of the structure material or at least 90% polymer based on the total weight of the structure material. The polymer, when cured, can have an elastic modulus in the range of 0.1 kPa to 10 GPa, such as, for example, 0.1 MPa to 50 MPa or 0.1 MPa to 10 MPa.

The rheological modifier can be added in an effective amount to the structure material to modify the structure material to have a yield stress. The structure material can comprise at least 0.1% rheological modifier based on total weight of the structure material, such as, for example, at least 0.5% rheological modifier, at least 1% rheological modifier, at least 2% rheological modifier, at least 5% rheological modifier, or at least 10% rheological modifier all based on the total weight of the structure material. The structure material can comprise no greater than 50% rheological modifier, such as, for example, no greater than 20% rheological modifier, no greater than 10% rheological modifier, no greater than 9% rheological modifier, no greater than 5% rheological modifier, or no greater than 3% rheological modifier, all based on the total weight of the structure material. For example, the structure material can comprise rheological modifier in a range of 0.1% to 50% based on the total weight of the structure material, such as, for example, 0.1 to 20%, 0.1% to 10%, 1% to 10%, 0.5% to 3%, 0.5% to 5%, 1% to 5%, or 5% to 10%, all based on the total weight of the structure material. The rheological modifier can comprise a thixotropic additive, a particle filler (e.g., nanoparticles, microparticles, nanofibers, microfibers), a polymer-based additive or other viscosity modifying agent. The polymer-based additive can form transient bonds (e.g., hydrogen bonds) that can be broken under applied shear. The transient bonds can be between the polymer-based additive itself, between the polymer-based additive and the structure material, or a combination thereof.

The yield stress of the structure material can be greater than 1 Pascal (Pa), such as, for example, greater than 10 Pa, greater than 20 Pa, greater than 30 Pa, greater than 40 Pa, greater than 50 Pa, greater than 100 Pa, or greater than 1 kPa. The yield stress of the structure material can be no greater than 10 kPa, such as, for example, no greater than 1 kPa, no greater than 500 Pa, no greater than 400 Pa, no greater than 300 Pa, no greater than 200 Pa, no greater than 175 Pa, no greater than 150 Pa, no greater than 125 Pa, or no greater than 100 Pa. For example, the yield stress of the structure material can be in a range of 1 Pa to 10 kPa, such as, for example, 1 Pa to 500 Pa, 10 Pa to 400 Pa, 10 Pa to 200 Pa, 20 Pa to 200 Pa, 50 Pa to 200 Pa, 50 Pa to 150 Pa, or 50 Pa to 100 Pa.

The material deposition region 806 can be configured for mechanically supporting the support material 808 during FRE additive manufacturing. For example, the material deposition region 806 can comprise a vessel in which the support material 808 is disposed and a platform on which the vessel is support. The material deposition region can comprise a motor and/or actuator that can move the platform in 3D space as needed.

The support material 808 can mechanically support at least a portion of the embedded structure material (i.e., object 814), maintain the intended geometry of the embedded structure material, and inhibit deformation of the structure material during the FRE additive manufacturing process. For example, the embedded structure material can be held in position within the support material 808 until the structure material is cured. The support material 808 can be stationary at an applied stress level below a threshold stress level and can flow at an applied stress level at or above the threshold stress level during the FRE additive manufacturing process.

The support material 808 can be a viscoplastic material with Bingham plastic-like rheological behavior. The support material 808 may demonstrate a significant shear thinning behavior such that the support material 808 acts like a solid material during deposition of the structure materials and then acts like a fluid when the nozzle 810 is moved through the support material 808 such that the movement of the nozzle 810 does not disturb the deposited structure material. A drop in viscosity of the support material 808 under dynamic loading can make the support material 808 suitable for FRE. For example, in FRE, the dynamic loading can be caused by the force of the nozzle 810 through the support material 808, affecting the support material 808 in a number of ways. The extruder assembly 802 can be configured to change the support material 808 by imposing a mechanical load via shear, pressure, or vibration. The extruder assembly 802 can be configured to irradiate or heat the support material 808 to thin it. In various examples, the support material 808 can reduce viscosity under vibration, heating, or irradiation that occurs locally to the extruder assembly 802.

The support material 808 can comprise other materials with viscoplastic behavior, such as Herschel-Bulkley fluid. Bingham plastics and Herschel-Bulkley fluids are viscoplastic materials included in the "shear-thinning" or "yield-stress fluid" category. Below a specific shear stress, these materials appear as a solid material. Above a threshold shear force, these materials behave as a fluid. A Bingham plastic may not necessarily "shear thin," but rather may act much like a Newtonian fluid once it begins to flow. In contrast, the Herschel-Buckley fluid undergoes shear thinning once it begins to flow.

The object 814 can be at least partially cured in the support material 808 after deposition of the structure material. In various examples, the structure material can be at least partially cured prior to removing the support material 808. In some examples, the structure material may not be cured until after removing the support material 808. As used in this specification, the terms "cure" and "curing" refer to the chemical crosslinking of components in the structure material. Accordingly, the terms "cure" and "curing" do not encompass solely physical drying of structure material through solvent or carrier evaporation. In this regard, the term "cured," as used in this specification, refers to the condition of the structure material in which a component of the structure material forming the object 814 has chemically reacted to form new covalent bonds in the structure material (e.g., new covalent bonds formed between a polymeric resin and a curing agent), new ionic bonds, new hydrogen bonds, new Vander walls bonds, or combinations thereof.

For example, curing of the object 814 can comprise cross-linking. The object 814 can be treated through various cross-linking techniques to selectively increase the rigidity of the overall object 814 or portions thereof. Cross-linking can be induced by various mechanisms such as, for example, photo mechanisms (e.g., exposing the structure material to UV light), ionic mechanism, enzymatic mechanism, pH mechanisms (e.g., exposing the structure material to a different pH) or thermally driven mechanisms (e.g., cooling, heating). In various examples, the support material 808 can include a cross-linking agent or pH suitable for curing the structure material as it is deposited into the support material 808. In some examples comprising a structure material comprising PDMS, then structure material can be cured at room temperature for 48 hours while in the support material 808 before removing the support material 808 by heating it to 37 degrees Celsius.

The mechanical properties of the object 814 can be controlled by controlling the amount of curing that occurs within the object 814. For example, the machine pathing instructions 832 can be tailored for control the amount of crosslinking that occurs within the respective segment 826 of the object 814. For example, the extruder assembly 802 can comprise a UV light and can selectively subject the embedded structure material to the UV light as desired.

The object 814 can be at least partially removed from the support material 808. Removing the support material 808 may include heating the support material 808, cooling the support material 808, removing cations to disrupt crosslinking of the support material 808, physically removing the support material 808, vibration, irradiation with ultraviolet, infrared, or visible light, application of a constant or oscillating electric or magnetic field, other mechanism, or a combination thereof.

The methods for additive manufacturing herein, such as those illustrated in described in FIG. 9 below, can be implemented in whole or in part as computer-executable instructions stored in the non-transitory memory 822 of the computer system 804 that, when executed by a processor 820 of the computer system 804, cause the computer system 804 to perform the enumerated steps. The computer instructions can be implemented as one or more software modules 816 stored in the memory 822 that are each programmed to cause the processor 820 to execute one or more discrete steps of the processes described herein or other functions. For example, the modules 816 can comprise a separation module programmed to convert the part file 824 into segments; a conversion module programmed to convert the segments 826 into computer instructions (e.g., G-code) for controlling the movement of the extruder assembly 802 to fabricate the object 814; a modeling module programmed to receive, store, create, and/or modify part files of objects to be fabricated; and a robotic control module programmed to control the extruder assembly 802 according to the instructions generated by the conversion module to fabricate the object 814. Various other modules can be implemented in addition to or in lieu of the aforementioned modules. In certain examples, the processes described herein can be executed across multiple computer systems that are communicably connected together in a network, a computer system communicably connected to a cloud computing system configured to execute one or more of the described steps, and so on.

Figure 9:
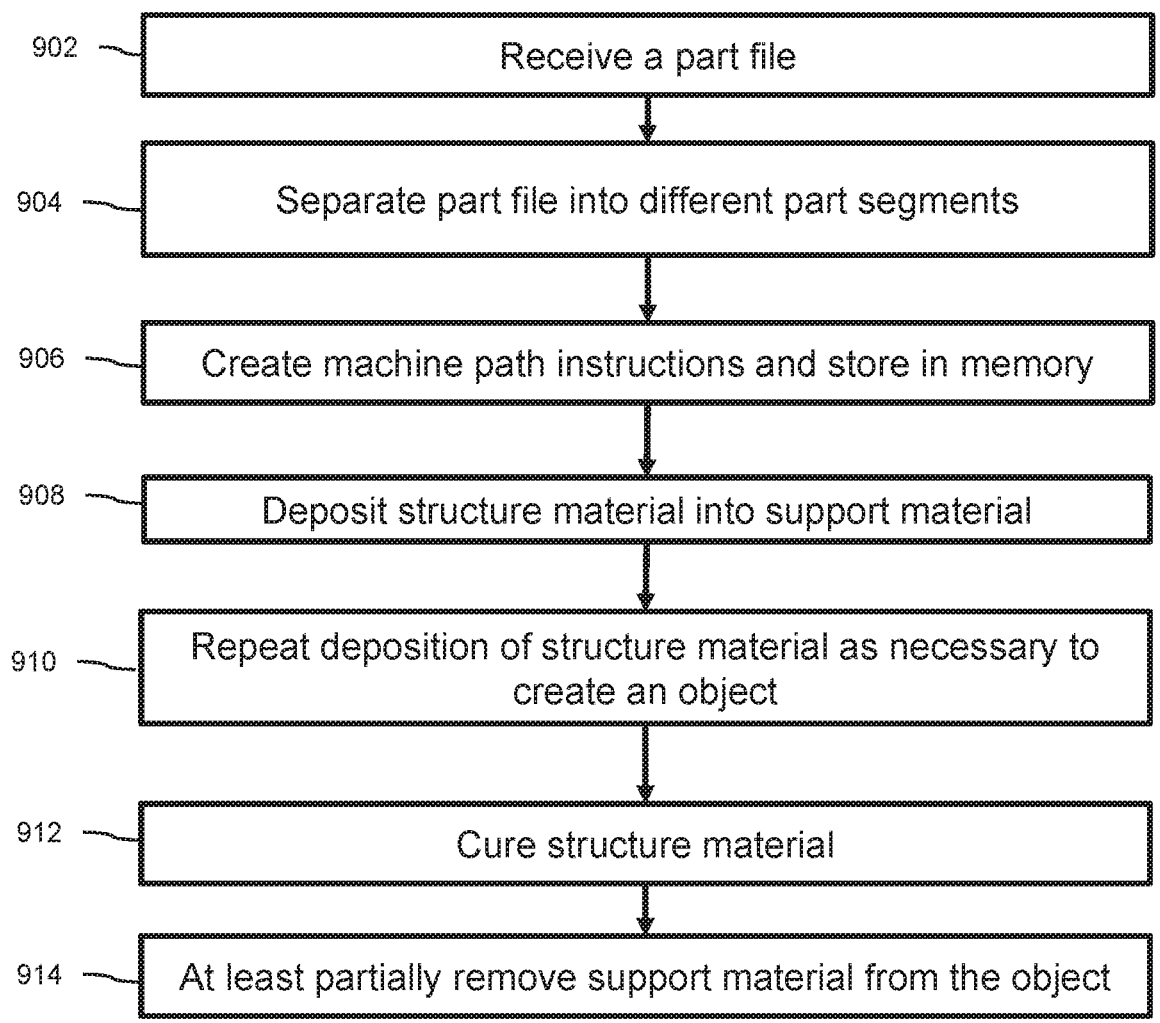
FIG. 9 is flow chart of an example of an additive manufacturing FRE method according to the present disclosure.

Referring to FIG. 9, a flow chart illustrating an additive manufacturing method according to certain implementations of the present invention is provided. The method comprises receiving, by the processor 820, a part file of an object 814 at step 902. At step 904, the processor 820, executing the separation module software, can separate (e.g., slice) the part file into different part segments. Each part segment contains a portion of the part file. The method further comprises, step 906, creating, by the processor 820, by executing the conversion module, machine path instructions (e.g., G-code instructions) for each segment based on the design of the portion of the part file in the respective segment and storing the machine path instructions in memory 822. The method can comprise, at step 908, depositing a structure material, by the nozzle 810, into the support material 808 by applying a force to the structure material such that the structure material can flow through the nozzle 810. At step 910, the depositing of the structure material can be repeated as necessary to create the object 814.

A print parameter can be varied from a first portion of the object to a second portion of the object. The nozzle 810 can be configured to move away from a previously deposited layer of the object when repositioning for deposition of a subsequent layer of the object.

Thereafter, at step 912, the structure material can be at least partially cured after depositing and then, at step 914, the support material can be at least partially removed from the object 814. The curing can occur prior to, during, after, or a combination thereof, removal of the support material at step 914.

EXAMPLES

Various aspects, benefits and features that are potentially realizable through implementation of the present invention will be more fully understood by reference to the following examples, which provide illustrative non-limiting aspects of the invention. It is understood that the invention described in this specification is not necessarily limited to the examples described in this section.

Preparation of Carbopol Support Bath

A 0.2% (w/v) Carbopol support bath was prepared by slowly adding 4 grams of Carbopol 940 (Lubrizol) to 2 liters of distilled water and mixing with a KitchenAid mixer for 15 minutes. Sodium hydroxide (1.0 N) (EMD Millipore) was then used to neutralize the bath to a pH of 7.0-7.1, inducing immediate gelling. The bath was mixed for an additional five minutes to ensure homogeneity. Prior to additive manufacturing, Carbopol gel was mixed for 2 minutes at 2000 RPM followed by 2 minutes of degassing at 2000 RPM in a planetary centrifugal mixer (Thinky). Alternatively, Carbopol was centrifuged at 2000 G for 20 seconds.

Preparation of PDMS Composite Inks for Use as a Structure Material

Sylgard 184 elastomer (Dow Corning) was prepared per manufacturer's directions by mixing 10 parts base resin to 1 part curing agent in a planetary centrifugal mixer (Thinky) for 2 minutes at 2000 RPM followed by 2 minutes of degassing at 2000 RPM. Five different PDMS composite inks were created by mixing HS II Thixotropic Additive (DOW SIL) at 1.0, 2.7, 5.0, 8.3, and 10.0% (w/w) with Sylgard 184 using the same mixing and degassing cycle. Silc Pig silicone color pigments (Smooth-On, Inc.) were used for contrast and incorporated into the PDMS prepolymer with HS II Thixotropic Additive prior to mixing.

Rheology

To measure the rheological properties of the PDMS composite inks, each formulation was loaded onto a rheometer (Discovery Hybrid Rheometer [DHR-2], TA Instruments) equipped with a 40 mm diameter, 1° cone. Stress ramps were conducted from 0.1-1000 Pa to obtain flow curves. Steady state stress sweeps were conducted over a range of 5-500 Pa for yield stress analysis; yield stress values were designated as the last data point before a significant drop in viscosity. These values were fit to a power curve in MATLAB. All curves were plotted in GraphPad Prism 8.4.2.

FRE 3D Printing (Additive Manufacturing)

Additive manufacture of PDMS composite inks was performed on a MakerGear printer modified with a custom-designed syringe pump extruder (Replistruder 4). The 3D models for printing were obtained from the Thingiverse database (https://www.thingiverse.com). All STL files were processed by Slic3r (https://slic3r.org) software. Custom G-code was created by generating G-code for each print region of interest (using modifiers in Slic3r) and subsequently merging the code in a text editor (Sublime Text). For filament morphology and deformability investigations, a custom MATLAB script was used to adjust the Z step to 60% of the layer height to obtain fusion. Prior to printing, PDMS composite inks were transferred into a 5.0 mL gastight glass syringe (Hamilton) and mounted into a Replistruder 4. A needle (Jensen Global) was fitted to the syringe and primed. All needles possessed a 1-inch stainless steel cannula. Most printing was performed with either a 635 μm or 406 μm ID needle. Carbopol was prepared and added to acrylic containers large enough to house the printed constructs. The container was secured to the print platform with a thin layer of vacuum grease. The needle was positioned in the center of the container and lowered in the support, leaving a small gap between the needle and the container bottom. Duet Wifi or Pronterface software was used to start the print. Upon print completion, the print container was removed from the print platform and allowed to cure overnight in an oven at 65° C. After curing, sodium chloride was sprinkled on the Carbopol support to induce liquification, enabling print removal.

Analysis of FRE Printed PDMS Structures

To evaluate filament and print morphology, a window frame model was printed over a range of print speeds (5-10 mm/s), flow tweaks (0.9-1.1), infill densities (10-90%), and print heights (1-5 print layers). Additionally, hollow cylinders were printed with 2-4 layers. These constructs were sliced through the middle, and the filament cross-sections were examined on a stereomicroscope. Aspect ratio was analyzed by measuring the height and width of each filament using ImageJ (https://imagej.net/Welcome) software. A surface plot of aspect ratio as a function of print speed and flow tweak was generated in MATLAB, and aspect ratio as a function of infill density was plotted in GraphPad Prism 8.4.2.

Mechanical Properties

Three PDMS formulations (0 wt %, 1.0 wt % and 2.7 wt % Thixotropic Additive) were cast into 150 mm Petri dishes to a thickness of ~3 mm and allowed to partially cure at room temperature overnight. Complete curing was obtained by placing the PDMS formulations in a 65° C. oven for 4 hours. Tensile bar strips were laser cut with a Rabbit laser cutter (model: RL-80-1290, Rabbit Laser USA). Additionally, tensile bar strips were FRE additively manufactured at 2.7 wt % Thixotropic Additive with three infill densities (cubic; aligned rectilinear, fill angle=0°; aligned rectilinear, 90°). Uniaxial tensile testing was conducted on all samples using an Instron 5943 (Instron), with a total of 6 samples per condition. Samples were stretched at a rate of 2.00 mm/min until failure. The modulus was determined from a simple linear regression of the stress-strain curves from 0-10%. Statistical analyses were performed using GraphPad Prism 8.4.2.

Challenges of FRE Printing with Deformable Inks

The high material deformability unique to FRE presents a challenge that is absent in FDM. Previously printed layers can be easily disrupted, with the directionality of shear stress directly related to the direction of machine pathing. To demonstrate this, a PDMS cube was printed. FRE printing, like all FDM-based printing techniques, has standard perimeters (the exterior shell) and infill (the interior core) as the two main regions of a print as seen in FIG. 1A. Both can contribute to the structural integrity of a print—greater shell thicknesses and infill densities yield stronger parts. Construction of lattice structures or models consisting only of perimeters has been demonstrated in embedded printing systems, but there are few geometries involving infill.

Figure 1B:
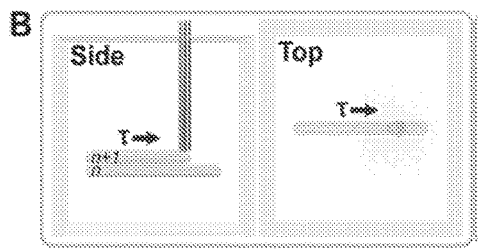
FIG. 1B is an image of an example of filament being extruded on top of a previously deposited filament which can apply a downward force on previous layers as the filament is extruded as well as shear stress at the interface of layers.
Figure 1C:
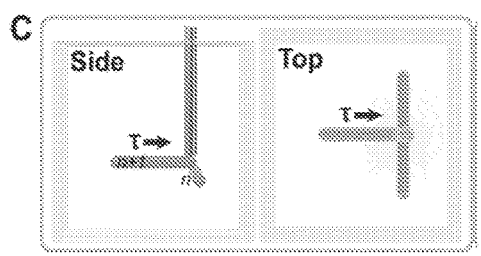
FIG. 1C is an image of an example of filament being extruded at an angle to a previously deposited filament in the infill which can result in filament displacement as the nozzle approaches a previous layer.
Figure 1D:
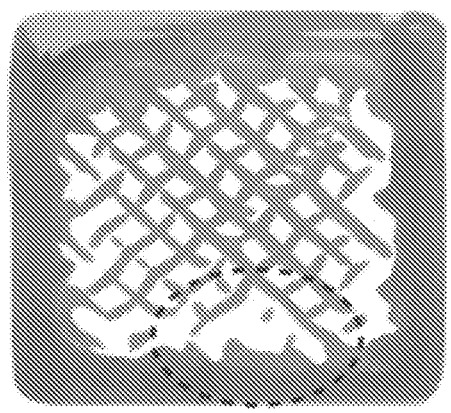
FIG. 1D is an image of a top view of an example of two printed layers of PDMS with intersecting infill, a dashed circle is used to mark an area where the infill is disrupted.
Figure 1E:
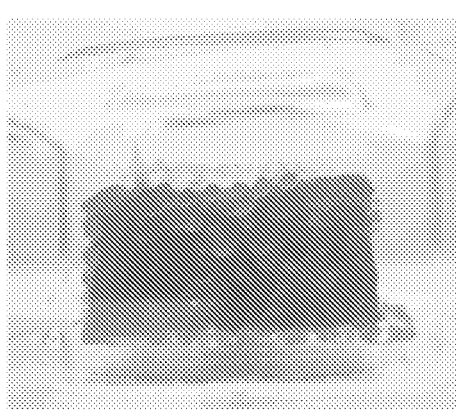
FIG. 1E is an image of an example calibration cube printed with PDMS in a support material of Carbopol where the PDMS coalesced and did not maintain the printed geometry.
Figure 1F:
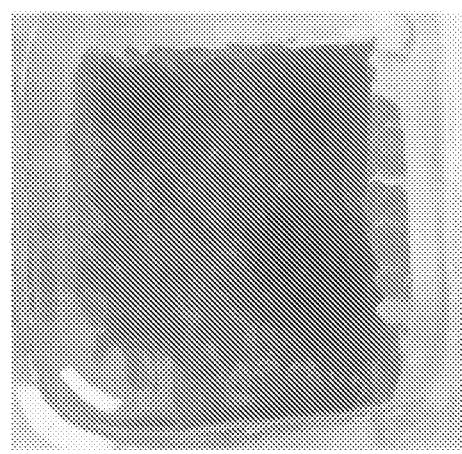
FIG. 1F is an image of the top view the calibration cube in FIG. 1E.

In printing the PDMS calibration cube, it became evident that the forces exerted in the perimeter are fundamentally different than those in the infill. In perimeters, layer n is first extruded, and layer n+1 is extruded upon it, following an identical or similar path as shown in FIG. 1B. Shear stress is generated along the layer interface and in the direction of the two filaments, resulting in minimal material disruption; displacement occurs along the printed path. In infill, layer n+1 often traces a path that is at an angle with respect to layer n as shown in FIG. 1C. Here, the shear stress can displace material in the direction of layer n+1, which often results in a departure from the printed path. These effects are especially evident when printing the PDMS prepolymer or other soft material, which exhibits Newtonian behavior and thus flows readily. When printing the first few layers of a calibration cube, the perimeter stays intact; the filaments within the infill, however, are broken up due to the interactions with the print nozzle as shown in FIG. 1D. Each passing of the nozzle results in further perturbations of previously extruded ink, making it difficult to maintain the printed geometry. Upon completion of the print, it is clear that these disruptions compound over time, resulting in extensive PDMS coalescence throughout the entire construct as shown in FIGS. 1E and 1F. Due to opposing wettability, PDMS coalescence in Carbopol is energetically favorable, and print nozzle movements provide sufficient driving force to enable this.

Modification of PDMS Rheology with a Thixotropic Additive

Figure 2A:
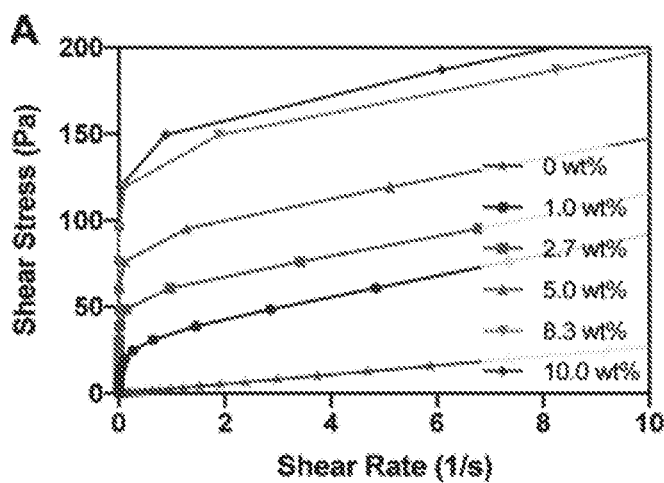
FIG. 2A is a graph illustrating the stress ramps of various example structure materials that demonstrate Bingham pseudoplastic behavior according to the examples described herein.

The rheology of the PDMS prepolymer—specifically its Newtonian profile and low viscosity—is the source of its high flowability and thus the ease of distortion demonstrated during printing. To combat this behavior, the rheological modifier HS II Thixotropic Additive (hereinafter referred to as "additive") was added to the PDMS prepolymer to create a yield stress fluid, e.g., one that flows only if subjected to a stress above a threshold value (known as the yield stress). Due to the desirable properties of the PDMS elastomer, such as its high extensibility and low modulus, low additive concentrations of 1.0-10.0% w/w (1.0, 2.7, 5.0, 8.3, and 10.0% w/w) were chosen to minimize the degree of modification. Stress ramps at each concentration revealed that the composite inks are indeed yield stress fluids, as indicated by the non-zero y-intercepts at each concentration as shown in FIG. 2A.

Figure 2B:
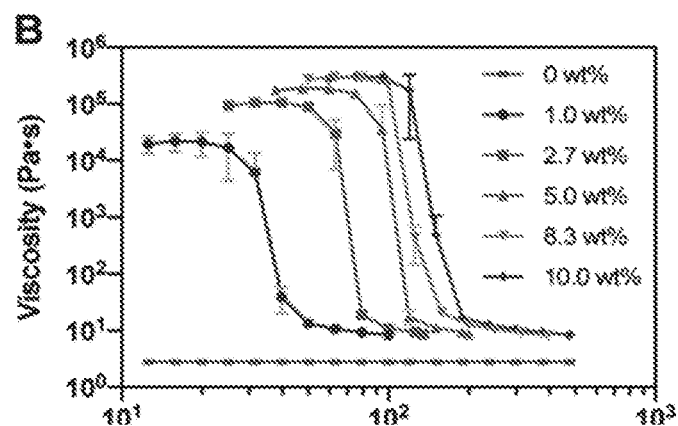
FIG. 2B is a graph illustrating steady stress sweeps of various example structure materials showing an increase in yield stress of various structure material compositions with an increase in rheological modifier concentration.
Figure 2C:
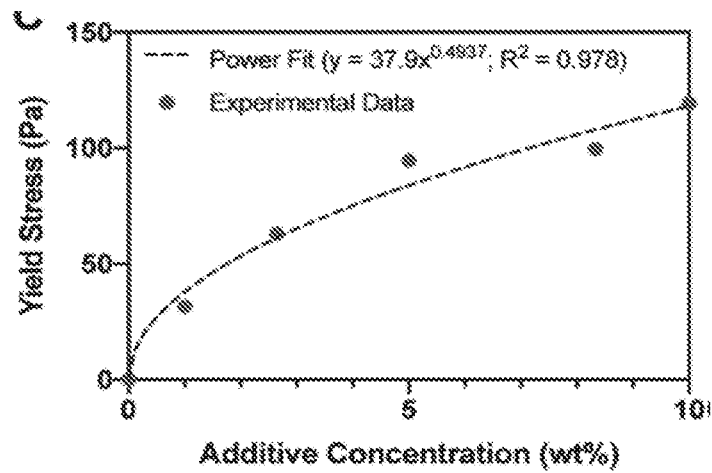
FIG. 2C is a graph illustrating a power fit curve where $R^2=0.978$ according to the examples described herein.

This rheological profile can be desirable for embedded printing: passing the yield stress can induce flow, making the fluid more capable of resisting deformation upon interactions with the print nozzle. Steady state stress sweeps indicate yield stress, which is the last value of stress prior to a large drop in viscosity, increases with additive concentration as shown in FIG. 2B. This behavior can be described with a power fit: y=37.9×0.4937 as shown in FIG. 2C, where yield stress plateaus at greater additive concentrations, suggesting that there is power law dependence as a jamming transition is approached. A concentration of 2.7% (w/w) additive was selected for all prints to induce a sufficient enough yield stress to substantially reduce flow during printing while minimizing modification of the native PDMS.

FDM Slicer Software Assumptions are Inadequate for FRE

Figure 3A:
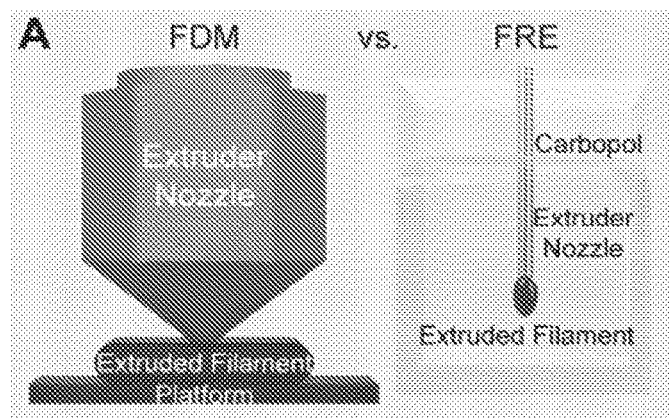
FIG. 3A is a diagram illustrating an example of an FDM extruder nozzle extruding filament on the left and an example of an FRE extruder nozzle extruding filament on the right.
Figure 3B:
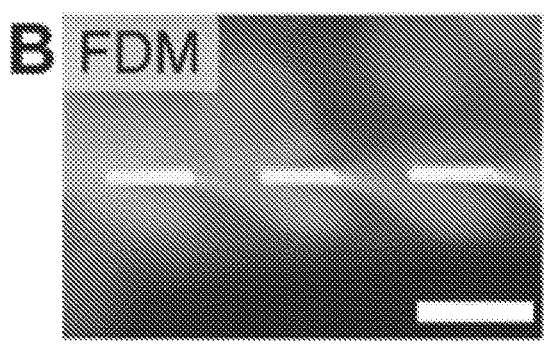
FIG. 3B is an image of a cross section of FDM printed filament, scale bar on the bottom right is 1 mm.

Rheological modification introduces a yield stress to the PDMS precursor that diminishes its flowability; this alone, however, may not be sufficient to create a robust embedded printing platform. Another factor that dictates print success is filament morphology, as this can impact machine pathing. FDM slicing software assume that (1) filaments are flattened onto the print platform during extrusion, yielding an oblong cross section with an aspect ratio (filament height divided by width) of less than 1 and (2) insignificant filament deformability is present post extrusion as illustrated in FIGS. 3A and 3B. In FDM, thermoplastic filament is heated above its melting temperature into the polymer's rubbery regime, where the filament can easily be extruded and flattened. After extrusion, the filament rapidly cools and returns to its glassy state, where it is effectively solid and does not deform for the duration of the print. The prepolymers used in FRE are typically not thermoplastics and thus do not possess the same materials properties. Furthermore, in FRE, a yield-stress support bath (e.g., support material in the material deposition region) replaces the print platform. These differences warranted an investigation into filament morphology to determine if the software's fundamental assumptions hold true for embedded additive manufacturing systems.

Figure 3C:
FIG. 3C is an image of a cross section of example FRE printed filament, the scale bar on the bottom right is 1 mm.

As illustrated in FIG. 3A, a FDM system is shown in the left and a FRE system is shown on the right. An example of a filament morphology of an FDM Filament is shown in FIG. 3B and an example of a filament morphology of FRE is shown in FIG. 3C.

Figure 3D:
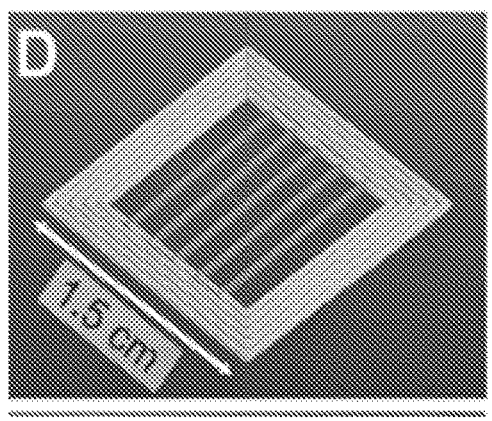
FIG. 3D is an image of an example frame model of printed filament.
Figure 3E:
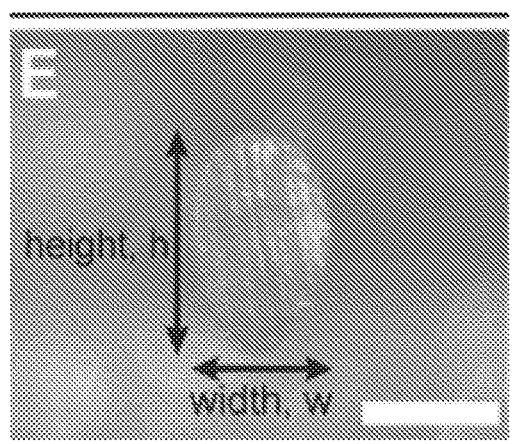
FIG. 3E is an image of a cross-section of example FRE printed filament that was printed at a translation speed of 5 mm/s and a flow tweak of 1, the scale bar in the bottom right is 0.5 mm.
Figure 3F:
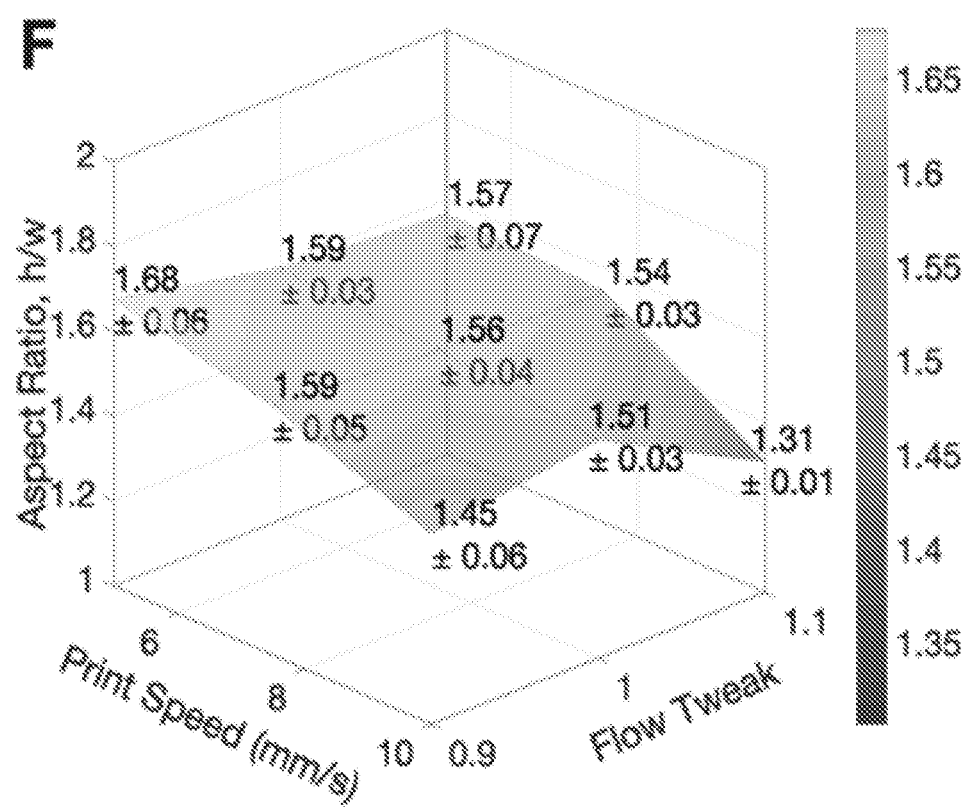
FIG. 3F is a graph illustrating the aspect ratio of example FRE printed filaments versus print speed and flow tweak, the graph shows that the aspect ratio is consistently greater than 1 over a range of print speeds (5-10 mm/s) and flow tweaks (0.9-1.1).

A window frame test model with single filaments printed across the center of the frame was designed to enable filament cross sectional analysis as shown in FIG. 3D. The printed construct is sectioned through the middle, and the filament cross-sections are imaged as shown in FIG. 3E. The aspect ratio of each filament is quantified by dividing the height by the width. The impact of various print parameters on filament morphology is of interest; print speed (e.g., nozzle translation speed) and flow tweak are demonstrated here. Print speed dictates print time and quality, while flow tweak (also known as the extrusion multiplier) is an adjustment (multiplier) to the flow rate of material. This print parameter is helpful for fine tuning material flow rate and can rectify defects such as crowning (excess of material) or under-extrusion. For instance, a flow tweak of 0.9 will result in under-extrusion, where the final flow rate is 90% of the original flow rate; similarly, a flow tweak of 1.1 will result in over-extrusion, where the final flow rate is 110% of the original. Constructs were printed at three print speeds (5, 7.5, and 10 mm/s) and flow tweaks (0.9, 1.0, 1.1). Additionally, the layer height was set equal to the extrusion width (which is equal to the inner diameter of the extrusion nozzle); this was held constant to ensure the material flow rate was consistent for every print.

Image analysis revealed that across the entire parameter space, the aspect ratio was greater than one—inconsistent with FDM. This is surprising, as it was expected that an individual filament would possess the same circular geometry as the hole from which it was extruded, especially since extrusion width and layer height held constant. This suggests that there is an area of low pressure directly trailing the print nozzle, and the PDMS ink fills this space until it is immobilized by the support bath. These results demonstrate that filament geometry in embedded printing, such as FRE systems, deviate from FDM filament geometry. In assuming an incorrect, FDM-like geometry for extruded filaments in FRE, slicing software incorrectly places filaments in its generation of machine pathing for a construct, which can result in print defects like under- or over-extrusion. This ultimately results in poor print fidelity. Print parameters should be selected and machine pathing should be created with this in mind.

Ink Deformability and Morphology are Dependent on Local Environment

Figure 4A:
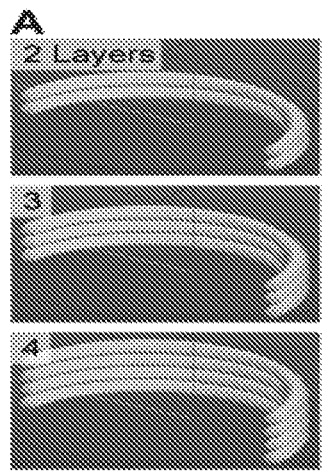
FIG. 4A is images illustrating the machine pathing for example shells to be printed with 2 layers on the top image, 3 layers in the middle image, and 4 layers in the bottom image.
Figure 4B:
FIG. 4B is images of example cross-sections of FRE printed filaments with 2 layers in the top image, 3 layers in the middle image, and 4 layers in the bottom image printed according to the machine pathing in FIG. 4A. 2 distinct morphologies were observed, rounded and flattened.

Due to the slow cure time and viscous nature of these inks, material deformability is another property that can deviate from FDM. Specifically, the interactions between adjacent filaments are of interest because this can inform optimal filament placement (packing). These interactions were examined in the context of both perimeters and infill. To determine how filaments in perimeters deform, hollow cylinders with 2, 3, and 4 layers were printed and sectioned in half as shown in FIG. 4A. Initially, there was poor or nonexistent interlayer fusion, resulting in cylinders that fell apart upon dissolution of the Carbopol. To counteract this, the distance between layers (or the Z step taken by the extruder nozzle after a layer change) was decreased in the G-code to achieve fusion. The original Z step (Z0) was equal to the layer height and extrusion width of 0.635 mm. The Z step was adjusted to 50, 60, 70, 80, and 90% of Z0, and evaluation of the filament cross-sections reveal that a step equal to 60% of Z0 was sufficient to achieve fusion between filaments. The filaments possessed both rounded and flattened morphologies, denoted by green and red arrowheads, respectively as shown in FIG. 4B. In the absence of an adjacent filament, such as at the bottom surface of a bottom layer or top surface of a top layer, filaments elongate vertically, in the same manner observed in FIGS. 3C and 3E. By contrast, filaments in intermediate layers deform their neighbors during deposition, effectively flattening out the adjacent surfaces in a manner similar to FDM.

Figure 4C:
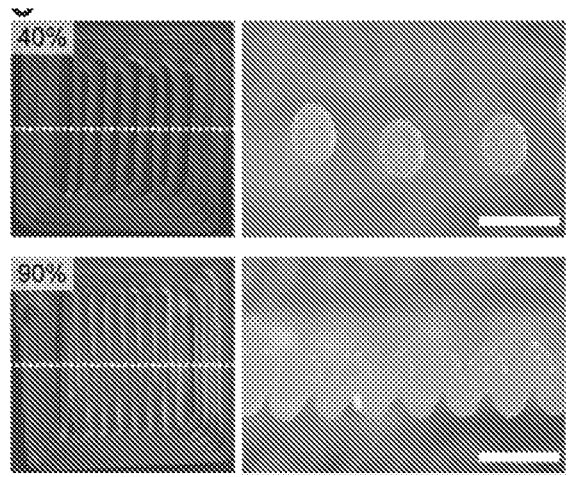
FIG. 4C is images of example printed objects on the left which were used to examine filament morphology as a function of infill density, which were cut at the dashed line and examined under a microscope resulting in the images on the right. The top images are an example of single layer filaments with 40% infill density and the bottom images single layer filaments with 90% infill density illustrating that filament elongation can be exacerbated at high infill densities.
Figure 4D:
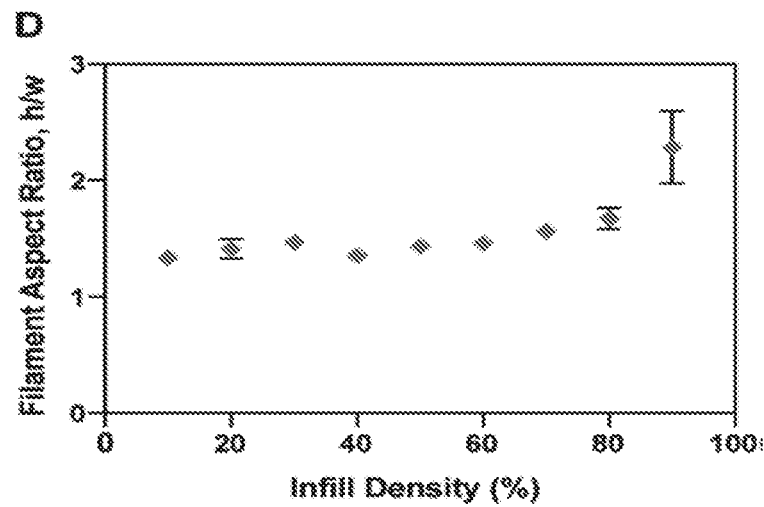
FIG. 4D is a graph illustrating aspect ratio can increase with infill density.
Figure 4E:
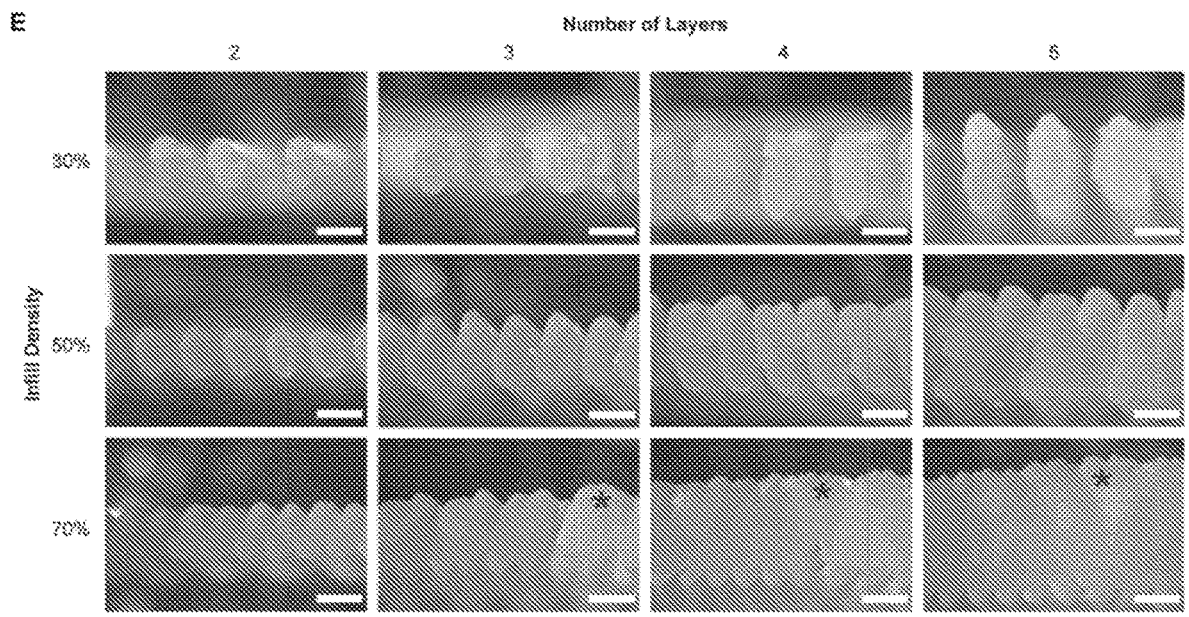
FIG. 4E is images illustrating the cross-sections of example FRE printed filaments over a range of infill densities and layer heights, asterisks denote regions of crowning and the scale bar in the bottom right of each image is 1 mm.

To investigate filament deformability in infill, the window frame model in FIG. 3D was modified to possess single layer infill densities from 10 to 90 percent. At 40% infill, the filaments possess an aspect ratio greater than one, as expected from the single filament morphology demonstrated in FIG. 3; at higher infill densities, aspect ratio shoots up as shown in FIGS. 4C and 4D. At these infill densities, the print nozzle approaches previously extruded filaments at increasingly close proximities, where it displaces the support laterally, causing nearby filaments to elongate vertically. The degree of elongation is closely linked to the infill density. To see if the observed morphologies present in perimeters and infill were consistent in a print containing both, the same frame model was printed with increasing infill densities (30, 50, and 70%) and increasing print height (2, 3, 4 and 5 layers). By examining morphology in 3D, it is evident that the previously seen behaviors are present: stacked filaments (in both perimeters and infill) flatten each other out, while lateral filaments packed close to one another elongate vertically in Z as shown in FIG. 4E. At high infill densities (seen at 70% for constructs with more than 2 layers), this translates into crowning, a print defect (as indicated by asterisks) where there is an undesirable excess of material in a region of a print, resulting from the displacement of ink by the extruder nozzle. This indicates that although the Z step needed to be adjusted for single perimeters or 1-layer constructs to achieve fusion, this is not necessary for 3D constructs, possibly due to increasing material deposited and an increasing frequency of interactions with the print nozzle that can encourage fusion. In fact, this decrease in the Z step most likely contributed to the crowning observed at 70% infill density. For all future prints, the Z step was not modified in the G-code.

Print Calibration Reveals Difficulties of Printing with Deformable Inks

Figure 5:
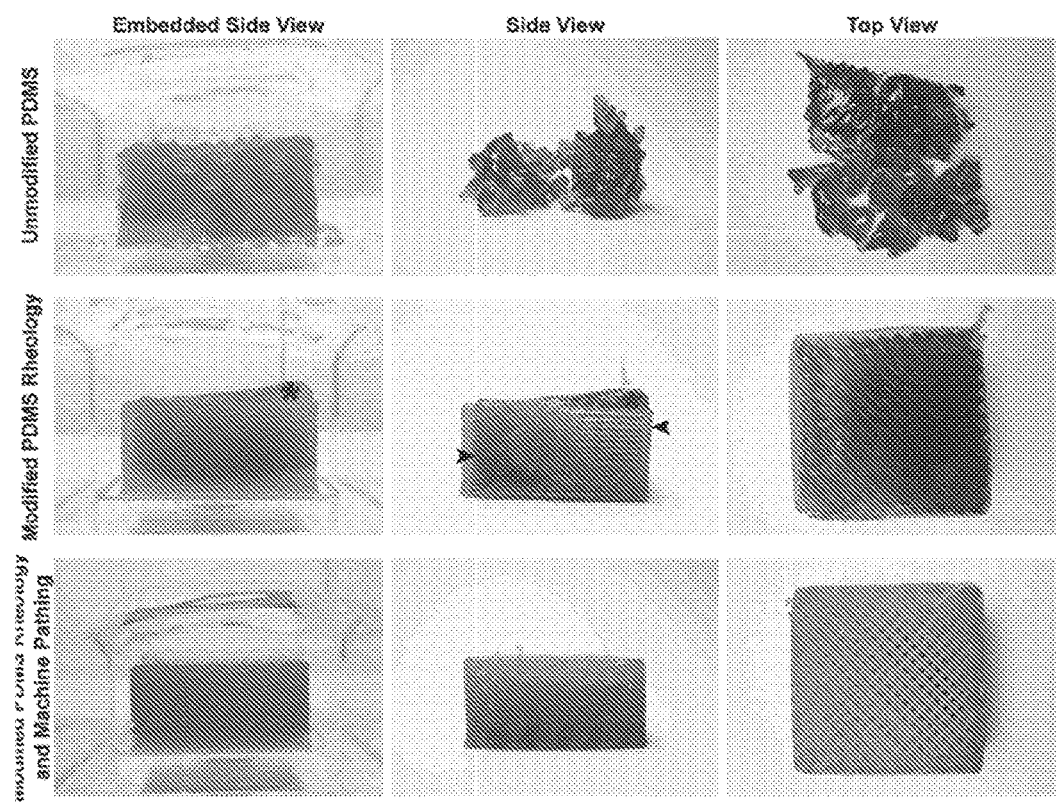
FIG. 5 is images of side views and top views of examples of FRE printed calibration cubes via modification of PDMS rheology and machine pathing. The left column of images shows the calibration cubes still in the support material. The top row of images illustrates that printing unmodified PDMS can result in coalescence of PDMS and disruption of previously printed layers, which can manifest in bubbles of PDMS. The middle row illustrates a calibration cube printed with a rheological modifier added to the structure material. The bottom row illustrates a calibration cube printed with a structure material comprising a rheological modifier and enhanced machine pathing.

In classical FDM additive manufacturing, a simple cube is used as a test model to calibrate and fine-tune the extruder and print settings. A calibration cube was selected as the model to determine general ranges of print settings that are appropriate for embedded printing as shown in FIG. 5. As previously noted, when printing the unmodified PDMS prepolymer, there is extensive coalescence throughout the entire structure. Despite this, the support bath maintains the general shape of the cube; upon Carbopol dissolution and print removal, however, the cube falls apart, leaving behind chunks of cured PDMS as shown in the top row of FIG. 5. By incorporating the HS II Thixotropic Additive (at 2.7% w/w), setting the layer height to 50% of the extrusion width and the infill density to 100%, the filaments maintain their printed geometries, even exhibiting characteristic FDM features, like individual layers. Release from the support bath confirms that layers are fused together and the cube remains intact, but closer inspection reveals that the print is riddled with defects, such as crowning (denoted by asterisks) and inconsistent fusion (denoted by arrowheads) as shown in the middle row of FIG. 5.

Due to the material deformability present in FRE as demonstrated in FIG. 4E, material displacement can produce these defects. Filaments can flatten as they are stacked on top of one another, which is consistent with the filament profile used in slicing software algorithms. Simultaneously, when filaments are packed closer to one another at high infill densities, material can be displaced vertically into adjacent layers where it can then be shifted by the print nozzle during travel moves, resulting in crowning. It was observed that upon completion of a layer, the print nozzle rises in Z and drags ink from one corner of the cube to the other as it transitions to printing the next layer. Due to the morphology and deformability inherent in this system, material is often displaced from its intended location, which can result in inconsistent fusion across a print (visually represented by variations in opacity in FIG. 5). In regions that contain crowning, excess material is packed together, creating an essentially solid part. In other regions, however, the infill is not fused to the shell. Lack of fusion at the infill/perimeter interface is also a result of the elasticity of the support bath. This causes the ink to recoil slightly when the print nozzle reverses directions, which often occurs where infill meets perimeters. If the two regions do not achieve physical contact, fusion may not be obtained.

Here, the challenges of printing with a deformable ink in an embedded printing system are clear: fusion is dependent on making contact with adjacent filaments, but these interactions, in addition to interactions with the passing print nozzle, often disrupt the ink and displace it from its intended location. Intelligent machine pathing is another factor that can affect print fidelity and success. From these observations, a few guiding principles for embedded printing are formed. First and foremost, travel moves (movements that do not involve ink extrusion and thus play no role in fusion) should take place outside of the body of the print (e.g., X-Y coordinates of the object being built) to minimize material displacement. Additionally, to account for the elasticity of the support bath, the overlap between infill and perimeter can be adjusted to 125% or more. Lastly, infill densities of 90% or less are generally sufficient to prevent crowning when the extrusion width is 50% of the layer height; this may vary with feature size. In making these adjustments, a dimensionally accurate calibration cube with good interlayer fusion was printed. These guiding principles were used to inform print parameter selection and machine pathing in all future prints.

Mechanical Properties of Casted and Printed Constructs

Figure 6A:
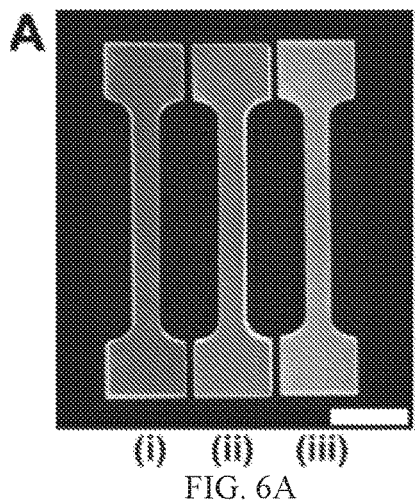
FIG. 6A illustrates a top view of example casted tensile testing specimens at (i) 0 wt %, (ii) 1.0 wt %, and (iii) 2.7 wt % rheological modifier, the scale bar in the bottom right is 1 cm.
Figure 6B:
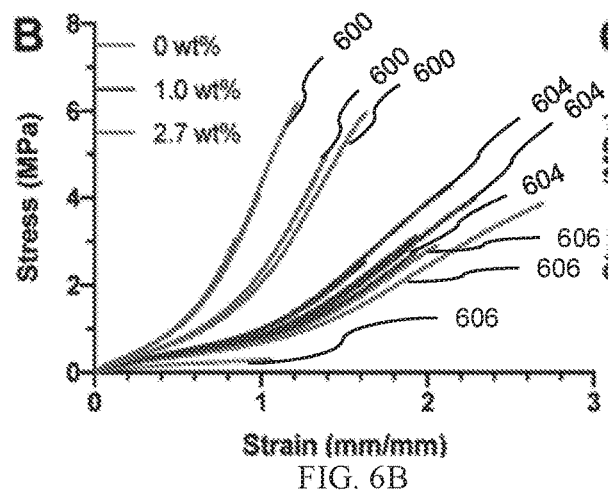
FIG. 6B is a graph of stress-strain curves for three example different PDMS formulations, (i) designated as 600, (ii) designated as 602, and (iii) designated as 606, (n=6).
Figure 6C:
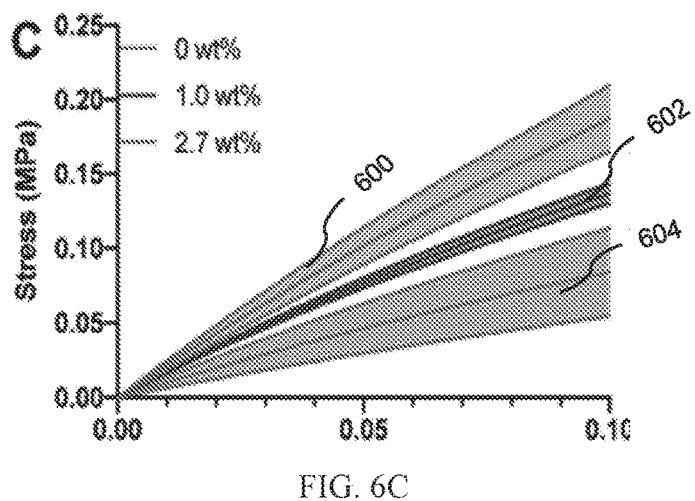
FIG. 6C is a graph of stress-strain curves for three different example PDMS formulations, (i) designated as 600, (ii) designated as 602, and (iii) designated as 606, (n=6) over 0-10% strain.
Figure 6D:
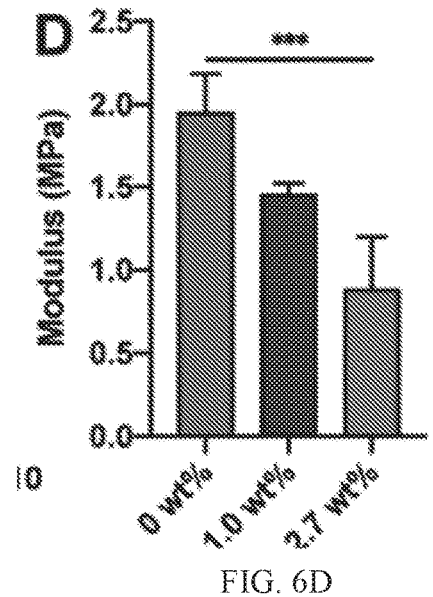
FIG. 6D is a column chart of the Young's Modulus of three different example PDMS formulations, (i), (ii), and (iii), (Kruskall-Wallis test with post-hoc Dunn's multiple comparisons test, *** indicates $p<0.001$).

After demonstrating the ability to print the modified inks, the mechanical properties of both casted and printed constructs were of interest. To determine the impact of the rheological modifier on PDMS properties, three PDMS+HS II formulations (at (i) 0%, (ii) 1.0%, and (iii) 2.7% w/w HS II) were casted and laser cut into tensile bar strips for uniaxial tensile testing (FIG. 6A). These tests revealed that modulus decreases with increasing additive concentration, suggesting that the additive behaves as a plasticizer in the PDMS network, decreasing crosslink density (FIGS. 6B, C, D).

Figure 6E:
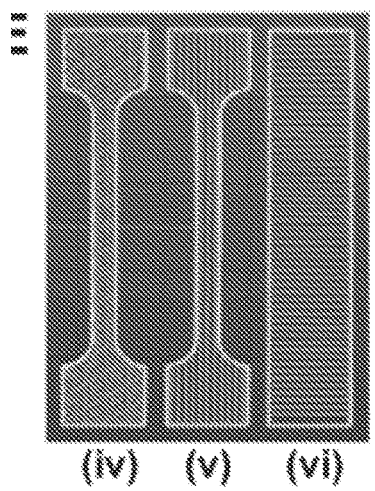
FIG. 6E is an image of example planned machine pathing for tensile testing specimens with (iv) cubic infill pattern, (v) aligned rectilinear infill pattern, fill angle=0° (denoted as "parallel"), and (vi) aligned rectilinear infill pattern, fill angle=90° (denoted as "perpendicular") infill patterns.
Figure 6F:
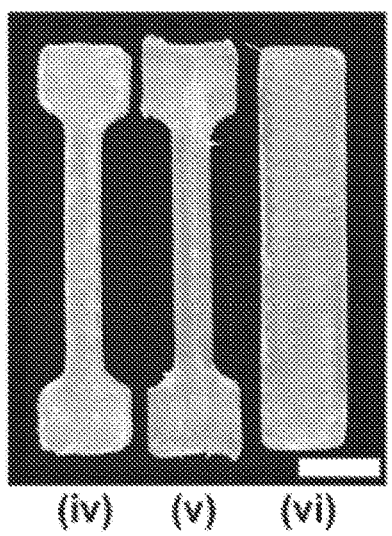
FIG. 6F illustrates a top view of example FRE printed tensile testing specimens with three different infill patterns, (iv), (v), and (vi). The scale bar in the bottom right is 1 cm.
Figure 6G:
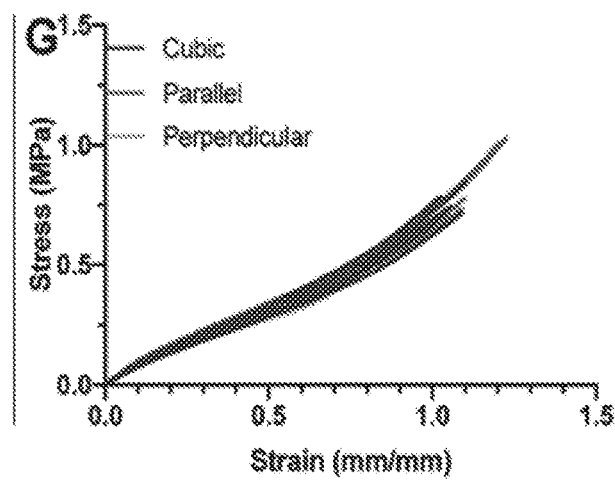
FIG. 6G is a graph of stress-strain curves for three different example infill patterns, (iv), (v), and (vi), (n=6).
Figure 6H:
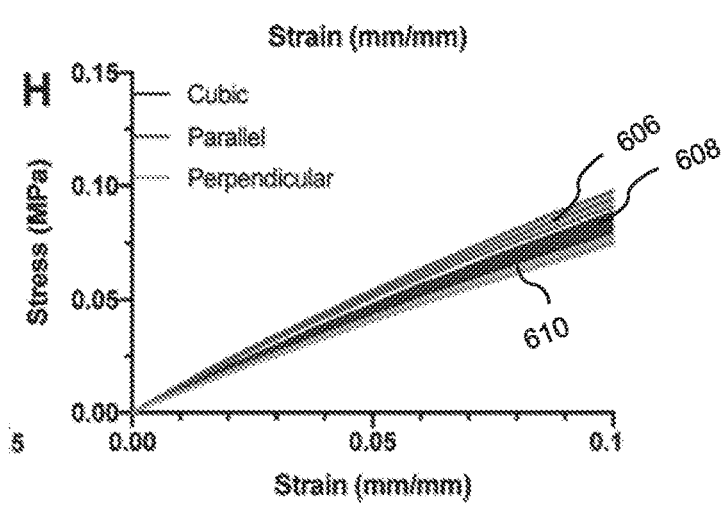
FIG. 6H is a graph of stress-strain curves for three different example infill patterns, (iv) designated as 606, (v) designated as 608, and (vi) designated as 610, (n=6) over 0-10% strain.
Figure 6I:
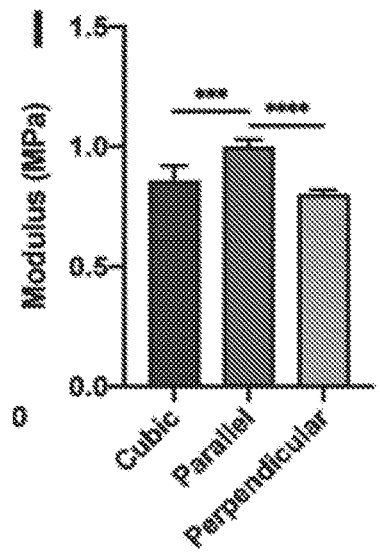
FIG. 6I is a column chart of modulus of casted and printed tensile test example specimens at 2.7 wt % rheological modifier/PDMS (one-way ANOVA and post-hoc Tukey's test, * indicates $p<0.001$, ** indicates $p<0.0001$).
Figure 6J:
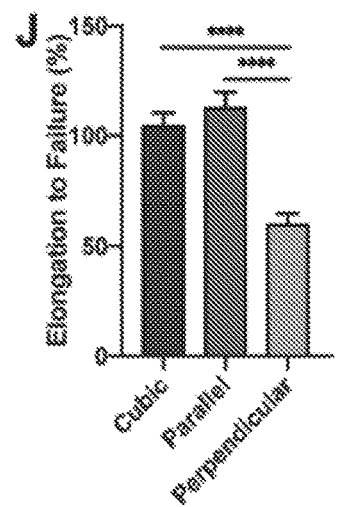
FIG. 6J is a column chart of elongation to failure as a function of infill pattern for three different example infill patterns, (iv), (v), and (vi). (one-way ANOVA and post-hoc Tukey's test, **** indicates $p<0.0001$).

Next, the impact of infill pattern was investigated. Infill patterns can be selected based on the desired structural integrity. Three infill patterns were selected: (iv) cubic, (v) aligned rectilinear, fill angle=0°, in the direction of uniaxial tensile test (denoted as "parallel"), and (vi) aligned rectilinear, fill angle=90°, perpendicular to the direction of the test (denoted as "perpendicular") (FIGS. 6E, F). Rectilinear infill patterns are very commonly used in additive manufacturing and are typically faster to print than more complex patterns. The fill angles were chosen to determine how filament directionality impacts mechanical properties. Cubic infill was chosen because it can be used for functional additive manufacturing that requires strength in multiple directions. Perpendicular constructs were printed as rectangular prisms as opposed to the conventional dog bone shape due to limitations in current slicing software. Testing showed that parallel constructs had a significantly greater modulus as compared to the other two constructs (FIGS. 6G, H, I). Furthermore, parallel and cubic constructs demonstrated a greater elongation to failure as compared to perpendicular constructs. The impact of filament directionality on mechanical properties is consistent with conventional FDM, where constructs are weaker between layers (FIG. 6J).[16] Interestingly, when comparing the stress-strain traces of printed and casted constructs, there is greater deviation in casted constructs, indicating that the casting and laser cutting processes produced inconsistences in the tensile test strips. At the same time, this indicates that printing produces consistent and uniform constructs. Together, these results demonstrate that the mechanical properties can be tuned by modifying additive concentration and infill pattern.

Improving FRE with Machine Pathing and Print Process Parameter Modifications

Figure 7:
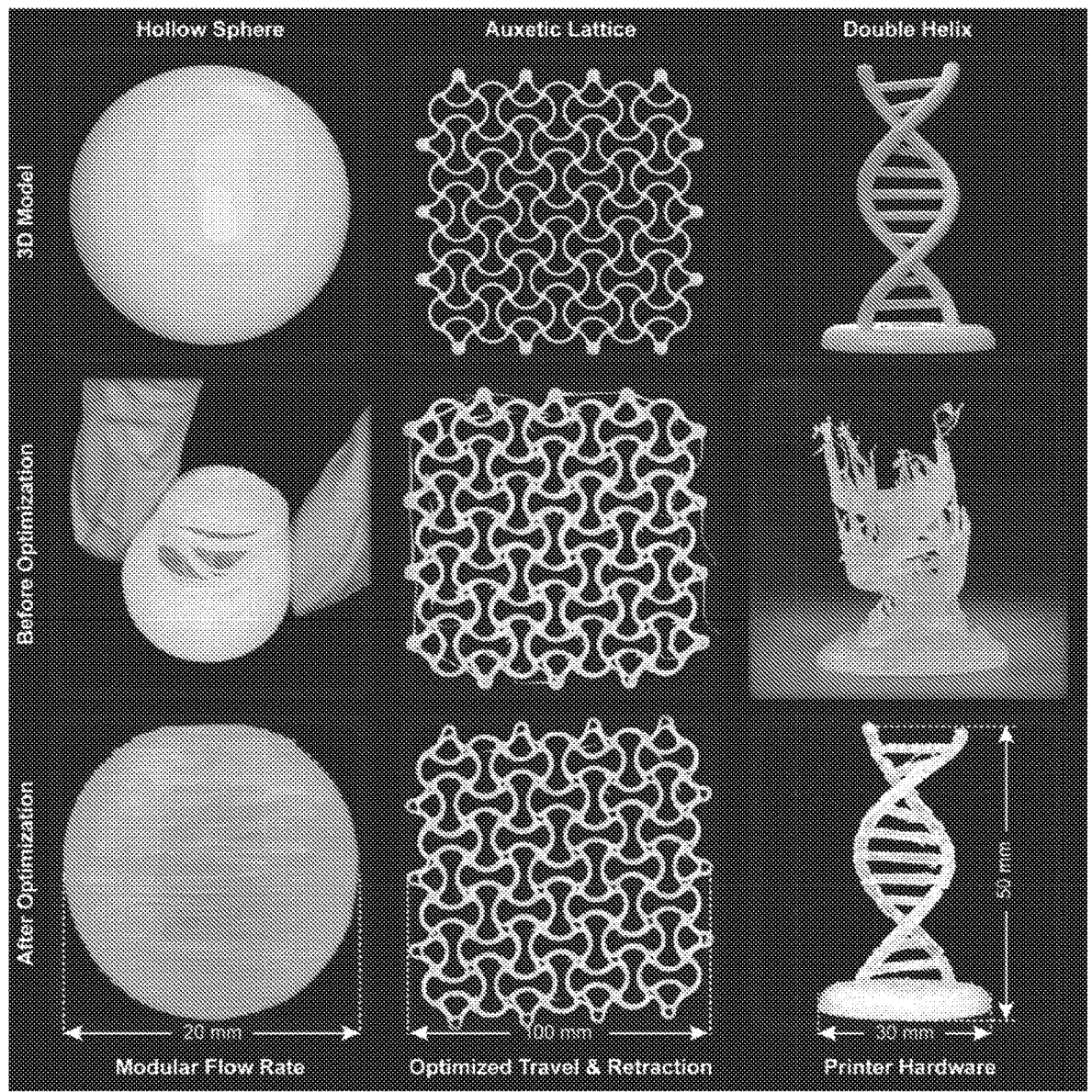
FIG. 7 is images of an example 3D model to be printed, an example of an un-optimized FRE print of the example 3D model, and an example optimized print of the 3D model. In the left column of images, the images illustrate that generating separate machine pathing (modulating flow rate) for different regions of a print can enable construction of a hollow sphere. In the middle column of images, the images illustrate that implementing retraction and lift travel moves enables construction of an auxetic lattice. In the right column of images, the images illustrate that utilizing a smaller nozzle size and stronger motor can enable construction of a right-handed double helix.

To explore the geometric limitations of the FRE platform, three test geometries were selected: a hollow sphere, auxetic lattice, and double helix (FIG. 7). First attempts to print the hollow sphere were moderately successful—the majority of layers were fused together, with the exception of layer separation predominantly present in the top quarter of the sphere (FIG. 7, left column). This supports earlier observations that single walls of filaments have difficulty obtaining fusion without decreasing the Z step. Additionally, due to a larger needle size (ID=635 μm), the slicing software was unable to slice the sphere without large gaps between layers on the top and bottom. To enhance layer fusion, a modular modification approach was taken. Specifically, G-code was modified for each region of interest. Four perimeters were originally used for this entire construct; through the addition of a modifier in Slic3r that introduces 6 perimeters in the top 3 mm, as well as the use of a smaller needle (ID=305 μm) and a flow tweak of 125%, a fused sphere was produced. The addition of extra perimeters as well as a higher flow rate results in a greater amount of ink extruded, which enables fusion.

Next, an auxetic lattice was selected to demonstrate the importance of retraction and smart travel moves. Retraction is a printing command that pulls material back into the nozzle to prevent unwanted material oozing out of the nozzle, which can result in stringing artifacts. A lift command can be implemented in conjunction with retraction during travel moves, which causes the extruder nozzle to lift a specified distance in Z above the layer that is currently being printed. This ensures that the nozzle will not drag material from one region of the print to the other; this is especially important in FRE where vertical filament elongation in Z (as demonstrated in FIG. 4) can displace material upward into future layers. First prints (in the absence of retraction and lift commands) demonstrated many stringing events, especially on the outskirts of the construct. These most likely result from ink oozing out of the nozzle during travel moves as well as ink displacement by the nozzle. By implementing and optimizing retraction and lift commands, stringing events are greatly reduced, and there is interlayer fusion, allowing for the lattice to be stretched repeatedly. Finally, a double helix was selected as the last print. This structure is quite difficult to cast or print via extrusion-based methods. First attempts to produce this structure failed—vertical stringing events occur where the nozzle lifts for retraction. The initial printer hardware was not sturdy enough for the rapid retraction, and the large needle size limited the smallest feature size. By switching to a smaller nozzle (ID=406 μm) and by using a custom-designed, sturdier syringe adaptor with a larger motor, greater retraction was enabled, and a double helix with solid base, small features, and few stringing events was produced.

These constructs demonstrate more guiding principles for embedded printing. First, it is sometimes necessary to take a modular approach to machine pathing—G-code should be modified by print region, if necessary. Additionally, the importance of implementing travel moves that occur outside of the print is reiterated. Interactions with the print nozzle and the deformable ink have a detrimental impact on print fidelity. Lastly, these prints demonstrate the importance of retraction and the need for sturdy hardware that is capable of dealing with thixotropic, viscous fluids. The FRE printing platform is not limited to the geometries shown here; with these machine pathing modifications, complex geometries can be obtained, which is promising for the future of polymers additive manufacturing.

Conclusion

It is clear that many factors influence the success of printing soft polymers using FRE. Rheological modification of structure materials can be leveraged to create yield stress fluids that are more capable of maintaining their printed geometries. Additionally, intelligent machine pathing and careful selection of print parameters can improve printed geometry. Specifically, interactions between the print nozzle and extruded filament can be minimized to prevent filament distortion. Travel moves are configured to take place outside the body of the print, and retraction should be employed to diminish stringing artifacts. A modular approach to machine pathing may achieve printed constructs with the highest fidelity. Furthermore, a robust additive manufacturing system with sturdy hardware can be used to extrude thixotropic, viscous fluids. The guiding principles provided in the examples herein can be extended to other material systems, greatly expanding capabilities of printing soft polymers utilizing FRE.

Any patent, publication, or other disclosure material identified herein is incorporated herein by reference in its entirety unless otherwise indicated but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

One skilled in the art will recognize that the herein described articles and methods, and the discussion accompanying them, are used as examples for the sake of conceptual clarity and that various configuration modifications are contemplated. Consequently, as used herein, the specific examples/embodiments set forth and the accompanying discussions are intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. An additive manufacturing method comprising: depositing a structure material, by a nozzle, into a support material by applying a force to the structure material such that the structure material flows through the nozzle, wherein the structure material comprises a thermoset polymer and a rheological modifier, wherein the support material is a viscoplastic material; repeating the depositing of the structure material to create an object comprising depositing a first layer of structure material and depositing a second layer of structure material in contact to the first layer such that the contact deforms the first layer of the structure material; and at least partially removing the support material from object, wherein the additive manufacturing method is freeform reversible embedding.

2. The method of claim 1, wherein the structure physical comprises 0.1% to 50% by weight of the rheological modifier.

3. The method of claim 1, further comprising curing the structure material after the depositing.

4. The method of claim 1, wherein
the structure material comprises a yield stress and wherein applying the force to the structure material comprises applying a force of at least the yield stress to the structure material;
the structure material comprises a thixotropic property and wherein applying the force to the structure material comprises applying a force to cause the structure material to flow through the nozzle;
the rheological modifier increases the viscosity of the structure material and wherein applying the force to the structure material comprises applying a force to cause the structure material to flow through the nozzle; or
a combination thereof.

5. The method of claim 1, wherein the structure material comprises a yield stress of the structure material is in a range of 1 Pa to 10 kPa and depositing comprising apply a force of at least the yield stress to the material.

6. The method of claim 5, wherein the yield stress of the structure material is in a range of 10 Pa to 200 Pa.

7. The method of claim 1, wherein the polymer comprises a silicone based polymer, an epoxy based polymer, a urethane based polymer, or a combination thereof.

8. The method of claim 1, wherein the polymer comprises polydimethylsiloxane.

9. The method of claim 1, wherein the rheological modifier comprises a thixotropic additive, a particle filler, a polymer-based additive, or a combination thereof.

10. The method of claim 1, wherein the structure material comprises:
0.1% to 20% by weight of the rheological modifier, and
at least 70% by weight of the polymer, wherein the structure material exhibits a yield stress in a range of 1 Pa to 10 kPa and the force is at least as greater as the yield stress.

11. The method of claim 10, wherein the yield stress of the structure material is in a range of 10 Pa to 200 Pa.

12. The method of claim 10, wherein
the polymer comprises a silicone based polymer, an epoxy based polymer, a urethane based polymer, or a combination thereof; and the rheological modifier comprises a thixotropic additive, a particle filler, a polymer-based additive, or a combination thereof.

13. The method of claim 10,
wherein the polymer comprises polydimethylsiloxane,
wherein the rheological modifier comprises a thixotropic additive.

14. The method of claim 10, wherein the structure material comprises
1% to 10% by weight of the rheological modifier, and
at least 90% by weight of the polymer.

15. The method of claim 10, wherein the structure material comprises an elastic modulus in a range of 0.1 MPa to 10 GPa.

16. The method of claim 10, wherein the structure material comprises an elastic modulus in a range of 0.1 MPa to 10 MPa.

17. The method of claim 1, wherein the structure material comprises an elastic modulus in a range of 0.1 MPa to 10 GPa.

* * * * *